US012177696B2

(12) United States Patent
Chandrasekaran

(10) Patent No.: US 12,177,696 B2
(45) Date of Patent: *Dec. 24, 2024

(54) LOCATION CLUSTERING AND ROUTING FOR 5G DRIVE TESTING

(71) Applicant: T-Mobile USA, Inc., Bellevue, WA (US)

(72) Inventor: Nirmal Chandrasekaran, Hillsborough, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,655

(22) Filed: Apr. 27, 2023

(65) Prior Publication Data

US 2024/0365141 A1    Oct. 31, 2024

Related U.S. Application Data

(60) Provisional application No. 63/498,229, filed on Apr. 25, 2023.

(51) Int. Cl.
*H04W 24/06* (2009.01)
*H04W 4/021* (2018.01)
*H04W 4/024* (2018.01)

(52) U.S. Cl.
CPC .......... *H04W 24/06* (2013.01); *H04W 4/021* (2013.01); *H04W 4/024* (2018.02)

(58) Field of Classification Search
CPC ..... H04W 24/06; H04W 4/021; H04W 4/024; H04W 4/90; H04W 64/00; H04W 4/02;

(Continued)

(56) References Cited

U.S. PATENT DOCUMENTS 7,046,790 B2   5/2006   Holmen
7,047,559 B2   5/2006   Ohmori
(Continued)

FOREIGN PATENT DOCUMENTS

CA       2921862 C  * 11/2018   .......... G01C 21/343
CN    105052229 A     11/2015
(Continued)

OTHER PUBLICATIONS

"Cluster Analysis—Wikipedia.org", https://web.archive.org/web/20220427224743/https://en.wikipedia.org/wiki/Cluster_analysis via Wayback Machine, Apr. 28, 2022, 22:47:43 Snapshot version.

*Primary Examiner* — Nizar N Sivji
*Assistant Examiner* — Jing Gao
(74) *Attorney, Agent, or Firm* — Perkins Coie LLP

(57) ABSTRACT

A computer system obtains information describing a geographical area segmented into multiple first clusters serviced by a telecommunications network. Multiple test locations are identified within the first clusters. Each test location is located within a grid of the geographical area. Each first cluster is recursively segmented into multiple second clusters until a difference between a number of test locations within each second cluster and a target number of test locations is less than a threshold number of test locations. A route is generated connecting test locations within each second cluster, using a routing application programming interface for performing drive testing of the telecommunications network. The computer system sends the route to one or more computer devices for performing the drive testing at the test locations in a sequence corresponding to the route.

20 Claims, 14 Drawing Sheets

(58) Field of Classification Search
CPC ... H04W 28/0247; H04W 4/029; H04W 4/44; H04W 4/025; H04W 4/40; H04W 4/026; G01C 21/3407; G01C 21/3658; G01C 21/3602; G01C 21/3819; G01C 21/34; G01C 21/20; G01C 21/28; G01C 21/30; G01C 21/3461; G01C 21/32; G01C 21/3446; G01C 21/3804; G01C 21/3807; G01C 21/00; G01C 21/3476; G01C 21/3644; G01C 21/367; G01C 21/3469
See application file for complete search history.

(56) References Cited

U.S. PATENT DOCUMENTS

| | | |
|---|---|---|
| 7,155,517 B1 | 12/2006 | Koponen et al. |
| 7,707,628 B2 | 4/2010 | Saito |
| 7,711,823 B2 | 5/2010 | Hukkanen |
| 7,729,700 B2 | 6/2010 | Alemany et al. |
| 7,970,394 B2 | 6/2011 | Behroozi et al. |
| 8,175,620 B2 | 5/2012 | Carlson et al. |
| 8,406,753 B2 | 3/2013 | Alles et al. |
| 8,495,167 B2 | 7/2013 | Valjakka |
| 8,620,624 B2 | 12/2013 | Skibiski et al. |
| 8,666,390 B2 | 3/2014 | Meredith et al. |
| 8,897,803 B2 | 11/2014 | Pylappan et al. |
| 8,934,463 B2 | 1/2015 | Santhanam et al. |
| 9,253,246 B2 | 2/2016 | Mori |
| 9,270,596 B2 | 2/2016 | Parker |
| 9,490,992 B2 | 11/2016 | Oike |
| 9,572,165 B2 | 2/2017 | Keerthi |
| 9,585,036 B1 | 2/2017 | Tektumanidze et al. |
| 9,596,367 B2 | 3/2017 | Ren |
| 9,619,187 B2 | 4/2017 | Asakura |
| 9,648,515 B2 | 5/2017 | Velev et al. |
| 9,819,561 B2 | 11/2017 | Freishtat et al. |
| 10,264,504 B2 | 4/2019 | Zhang et al. |
| 10,311,336 B1 | 6/2019 | Kim et al. |
| 10,339,424 B1 | 7/2019 | Kim et al. |
| 10,349,422 B2 | 7/2019 | Reis et al. |
| 10,447,699 B2 | 10/2019 | Liu et al. |
| 10,448,101 B2 | 10/2019 | Tsuda et al. |
| 10,460,210 B1 | 10/2019 | Kim et al. |
| 10,721,151 B2 | 7/2020 | Sintorn et al. |
| 10,827,003 B2 | 11/2020 | Yang et al. |
| 10,841,345 B2 | 11/2020 | Le Sage et al. |
| 10,855,811 B2 | 12/2020 | Zhang |
| 10,993,201 B2 | 4/2021 | Luecke |
| 11,025,601 B2 | 6/2021 | Arisankala et al. |
| 11,064,345 B1 | 7/2021 | Mahajan et al. |
| 11,109,194 B1 | 8/2021 | Pinheiro et al. |
| 11,455,669 B2 | 9/2022 | Nagarathinam et al. |
| 11,470,490 B1 | 10/2022 | Tuli et al. |
| 11,490,323 B2 | 11/2022 | Xiao et al. |
| 11,523,279 B2 | 12/2022 | Lampin et al. |
| 11,526,824 B2 | 12/2022 | Kabra et al. |
| 11,615,409 B1 | 3/2023 | Rehm |
| 11,689,586 B2 | 6/2023 | Li |
| 12,092,730 B2 | 9/2024 | Keating et al. |
| 2003/0224806 A1 | 12/2003 | Hebron |
| 2005/0064864 A1 | 3/2005 | Horton et al. |
| 2008/0077356 A1 | 3/2008 | Dressler et al. |
| 2008/0155678 A1 | 6/2008 | Ohkubo et al. |
| 2008/0268839 A1 | 10/2008 | Ayers et al. |
| 2009/0163212 A1 | 6/2009 | Hall et al. |
| 2010/0009696 A1 | 1/2010 | Fok et al. |
| 2010/0020717 A1 | 1/2010 | Mcgregor et al. |
| 2012/0310691 A1 | 12/2012 | Carlsson et al. |
| 2012/0317186 A1 | 12/2012 | Koidl et al. |
| 2013/0117460 A1 | 5/2013 | Hsu et al. |
| 2013/0138367 A1 | 5/2013 | Boivin et al. |
| 2014/0293955 A1 | 10/2014 | Keerthi |
| 2015/0213133 A1 | 7/2015 | Jin |
| 2018/0139790 A1 | 5/2018 | Hou |
| 2019/0320328 A1 | 10/2019 | Magzimof et al. |
| 2019/0353499 A1* | 11/2019 | Stenneth ............ G06F 3/04817 |
| 2020/0042620 A1 | 2/2020 | Aggarwal et al. |
| 2020/0082318 A1 | 3/2020 | Liu et al. |
| 2020/0200552 A1* | 6/2020 | Sood ................ G01C 21/3461 |
| 2020/0202730 A1 | 6/2020 | Nayak |
| 2020/0317223 A1 | 10/2020 | Kovacek et al. |
| 2021/0192550 A1 | 6/2021 | Tang et al. |
| 2021/0250838 A1 | 8/2021 | Lu et al. |
| 2021/0343142 A1 | 11/2021 | Lewis et al. |
| 2021/0352464 A1 | 11/2021 | Xu et al. |
| 2022/0118870 A1 | 4/2022 | Kosseifi et al. |
| 2022/0161817 A1 | 5/2022 | Anastassov |
| 2022/0221285 A1 | 7/2022 | Oruganti et al. |
| 2022/0256364 A1 | 8/2022 | Jat et al. |
| 2022/0374488 A1 | 11/2022 | Tang et al. |
| 2022/0377569 A1* | 11/2022 | Turczyn ............... H04W 24/02 |
| 2023/0075690 A1 | 3/2023 | Bhat |
| 2023/0084924 A1 | 3/2023 | White et al. |
| 2023/0095772 A1 | 3/2023 | Kim et al. |
| 2023/0105365 A1 | 4/2023 | Jung |
| 2023/0110023 A1 | 4/2023 | Bellamkonda et al. |
| 2023/0153124 A1 | 5/2023 | Zhao et al. |
| 2023/0156586 A1 | 5/2023 | Yang |
| 2023/0164135 A1 | 5/2023 | Chen et al. |
| 2023/0164558 A1 | 5/2023 | Fujita et al. |
| 2023/0168094 A1 | 6/2023 | Beaurepaire et al. |
| 2024/0056496 A1 | 2/2024 | Zhou |
| 2024/0305625 A1 | 9/2024 | Qiu |

FOREIGN PATENT DOCUMENTS

| | | |
|---|---|---|
| CN | 105933159 A | 9/2016 |
| CN | 105939384 A | 9/2016 |
| CN | 108579075 A | 9/2018 |
| CN | 109947774 A | 6/2019 |
| CN | 111194098 A | 5/2020 |
| CN | 111371625 A | 7/2020 |
| CN | 111542848 A | 8/2020 |
| CN | 112019378 A | 12/2020 |
| CN | 112118151 A | 12/2020 |
| CN | 112148320 A | 12/2020 |
| CN | 110636044 B | 1/2021 |
| CN | 113127594 B | 9/2021 |
| CN | 113596712 A | 11/2021 |
| CN | 113691971 A | 11/2021 |
| CN | 113709839 A | 11/2021 |
| CN | 113709914 A | 11/2021 |
| CN | 113872797 A | 12/2021 |
| CN | 109548041 B | 1/2022 |
| CN | 110944323 B | 8/2022 |
| CN | 112351435 B | 9/2022 |
| CN | 114286404 B | 3/2023 |
| CN | 113141570 B | 4/2023 |
| CN | 114979964 B | 4/2023 |
| CN | 112788090 B | 6/2023 |
| CN | 115021831 B | 3/2024 |
| CN | 114760298 B | 5/2024 |
| CN | 114301964 B | 9/2024 |
| CN | 115297529 B | 9/2024 |
| DE | 202013103369 U1 | 8/2013 |
| DE | 112013003027 T5 | 3/2015 |
| DE | 112020000054 T5 | 3/2021 |
| DE | 102020132559 A1 | 12/2021 |
| DE | 102020102699 B4 | 3/2022 |
| EP | 2119265 A1 | 11/2009 |
| EP | 2111721 B1 | 10/2012 |
| EP | 2777332 A1 | 9/2014 |
| EP | 2842262 A1 | 3/2015 |
| EP | 3145260 A1 | 3/2017 |
| EP | 3686783 A1 | 7/2020 |
| EP | 3686784 A1 | 7/2020 |
| EP | 3686799 A1 | 7/2020 |
| EP | 3629629 B1 | 5/2021 |
| EP | 3598801 B1 | 8/2024 |
| EP | 4436251 A1 | 9/2024 |
| JP | 2014510261 A | 4/2014 |
| JP | 6466475 B2 | 1/2019 |
| JP | 2020119536 A | 8/2020 |
| JP | 2020119537 A | 8/2020 |
| JP | 6864891 B2 | 4/2021 |

(56) References Cited

FOREIGN PATENT DOCUMENTS

| | | |
|---|---|---|
| KR | 101576039 B1 | 12/2015 |
| KR | 102326278 B1 | 11/2021 |
| WO | 0046966 A2 | 8/2000 |
| WO | 02071781 A1 | 9/2002 |
| WO | 2008097505 A2 | 8/2008 |
| WO | 2008097995 A1 | 8/2008 |
| WO | 2008144991 A1 | 12/2008 |
| WO | 2012087419 A2 | 6/2012 |
| WO | 2014141785 A1 | 9/2014 |
| WO | 2014158205 A1 | 10/2014 |
| WO | 2014190561 A1 | 12/2014 |
| WO | 2015081709 A1 | 6/2015 |
| WO | 2017128293 A1 | 8/2017 |
| WO | 2018210057 A1 | 11/2018 |
| WO | 2020194940 A1 | 10/2020 |
| WO | 2020199396 A1 | 10/2020 |
| WO | 2021027568 A1 | 2/2021 |
| WO | 2021042398 A1 | 3/2021 |
| WO | 2021134719 A1 | 7/2021 |
| WO | 2021197347 A1 | 10/2021 |
| WO | 2021218317 A1 | 11/2021 |

\* cited by examiner

LOCATION CLUSTERING AND ROUTING FOR 5G DRIVE TESTING

CROSS-REFERENCE TO RELATED APPLICATIONS

This application claims the benefit of U.S. Patent Application No. 63/498,229, filed on Apr. 25, 2023, entitled LOCATION CLUSTERING AND ROUTING FOR 5G DRIVE TESTING, which is hereby incorporated by reference in its entirety.

BACKGROUND

Drive testing refers to the process of connecting to and collecting information from a cellular network at different geographical locations. The information collected describes the interactions between the cellular network and mobile devices, and can be used for network reconfiguration and management. However, drive testing is a time- and resource-intensive process. The time taken to perform drive testing can be prohibitive for large geographical areas or when the routes to be driven across a geographical area are complex.

BRIEF DESCRIPTION OF THE DRAWINGS

Detailed descriptions of implementations of the present technology will be described and explained through the use of the accompanying drawings.

Figure 1:
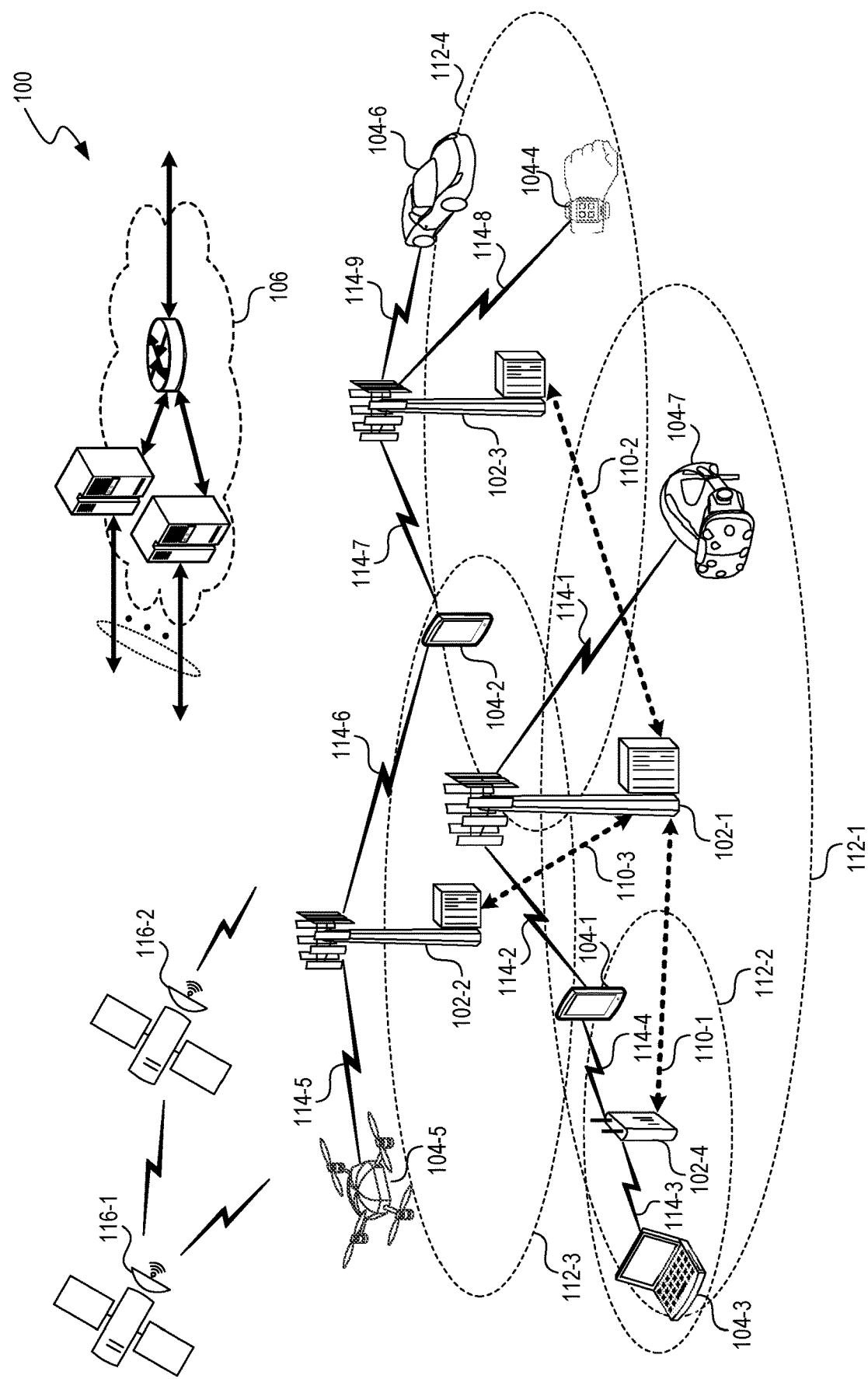
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Drive testing is used to measure and assess the coverage, capacity, and Quality of Service (QOS) of a mobile radio network across a geographical area. Drive testing generally requires a vehicle outfitted with drive testing measurement equipment. Typically, the technique consists of using a vehicle containing mobile radio network air interface measurement equipment that can detect and record various physical and virtual parameters of mobile cellular service in a given geographical area. The equipment typically includes specialized electronic devices that interface to original equipment manufacturer (OEM) mobile handsets. The drive testing measurement equipment provides measurements that are comparable to actual user experiences.

Collecting information and measurements that describe interactions between the mobile radio network, for example, a cellular network, and mobile devices across the geographical area is important for wireless providers to determine how users experience the network across the geographical area. The information and measurements enable the wireless providers to improve overage and service by network enhancements. However, drive testing using existing solutions is a time- and resource-intensive process. The time taken to perform drive testing can be prohibitive for large geographical areas or when the routes to be driven across a geographical area are complex. Moreover, conventional methods for drive testing can be fuel-inefficient and can lead to excessive greenhouse gas emissions by the vehicles used to perform the drive testing. There is thus a need for improved methods for drive routing and testing to accommodate complex scenarios and efficiently gather measurements for analytics, network planning, and performance management.

This document discloses methods, systems, and apparatuses for location clustering and routing for drive testing to address the challenges posed by large geographical areas and complex drive routes. The disclosed technology applies machine learning techniques to cluster test locations for more efficient drive testing. In some implementations, a computer system performs recursive clustering of groups of locations to avoid generating routes between disparately located areas. The computer system can insert intermediate locations within drive test grids to meet routing constraints. Moreover, the disclosed technology applies machine learning techniques to identify grids for which a route segment cannot be generated, and remove such grids from consideration to reduce the processing time for clustering grids together as well as generating a route for drive testing.

The implementations described herein can be applied to 5G drive testing as well as to other network and communication technologies and standards, such as 3G, 4G, 6G, 7G, or 8G. To prepare a geographical area, such as a county, a state, a set of states, or a country for drive testing, the geographical area is segmented into grids. A grid can be a square, a rectangle, or another type of polygon or closed shape.

To group grids for efficient drive testing of a telecommunications network, the disclosed system obtains data describing the geographical area serviced by the telecommunications network. The data is obtained from a governmental body or organization, such as the Federal Communications Commission (FCC), a mobile network operator, another commercial entity, etc. The computer system identifies multiple grids having test locations within the geographical area. The grids are equally sized or substantially equally sized portions of the geographical area. Each test location is located within a grid and is used for testing network performance of the telecommunications network. The multiple grids are grouped into multiple clusters, such that each cluster includes more than one grid. The grouping is performed such that a size of each cluster lies within a specified range of sizes. After the grouping, the computer system sends information describing the multiple clusters and test locations within each cluster to one or more computer devices for performing drive testing in a more efficient manner compared to traditional methods.

To cluster test locations more efficiently in a shorter time period, in some implementations, a computer system obtains data describing a geographical area, which is segmented into multiple first clusters. The first clusters can describe market boundaries or portions of the geographical area classified according to network performance. Multiple test locations are located within the multiple first clusters, such that each test location is located within a grid of the geographical area. The computer system recursively segments each first cluster of the multiple first clusters into smaller second clusters until a number of test locations within each second cluster substantially equals a target number of test locations. The recursive clustering is performed in less time when compared to conventional methods. Information describing the test locations located within each second cluster is used for drive testing of the telecommunications network at the test locations.

To generate a route for vehicles to navigate for drive testing, the computer system obtains information describing multiple grids across which a telecommunications network is deployed. The grids include test locations that are to be included on the route. A road location within a threshold distance from each test location is determined. The computer system uses machine learning to identify and group an unroutable subset of grids based on drivable road data. For example, the unroutable subset of grids includes grids lacking a drivable road, grids where a road location is located on a private road, or grids where the road location is blocked. The unroutable subset is removed to provide a routable subset of grids, such that computation resources are not expended on unroutable road locations. The routable subset includes the remaining road locations. The computer system generates a route connecting the remaining road locations for performing the drive testing in an efficient manner.

In some implementations, the computer system generates a route for drive testing that meets routing constraints for multiple grids across which a telecommunications network is deployed. A first road location within a first grid and a second road location within a second grid are identified based on drivable road data. The disclosed system identifies a set of zones of the first grid as well as a zone that a line from the first road location to the second road location will pass through. Based on the zone, if the computer system determines that a route segment between the road locations would violate a routing constraint, an intermediate road location is inserted such that the routing constraint is met. A route is generated and sent to one or more other computer devices for drive testing at the road locations in a sequence corresponding to the route.

The benefits and advantages of the implementations described herein include a reduction in the number of miles driven and a corresponding reduction in greenhouse gas emissions for drive testing of cellular networks. Especially, wasteful back-and-forth routes between disparately located areas are prevented. The systems disclosed herein meet drive routing constraints while completing drive testing of grid clusters in a specified time period. The generated grid clusters provide more uniform network coverage of geographically dispersed population centroids and are generated more efficiently using machine learning-based recursive grouping when compared to conventional methods. In addition, by using machine learning techniques, such as k-means clustering, constrained k-means clustering, and/or recursive clustering, the disclosed implementations obviate the need for feature extraction, which can be a resource intensive process. Similarly, by using machine learning techniques, such as convolutional neural networks (CNNs), which use shared weights in convolutional layers, the disclosed implementations enable reduction of memory footprint and improvement in clustering and routing performance.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
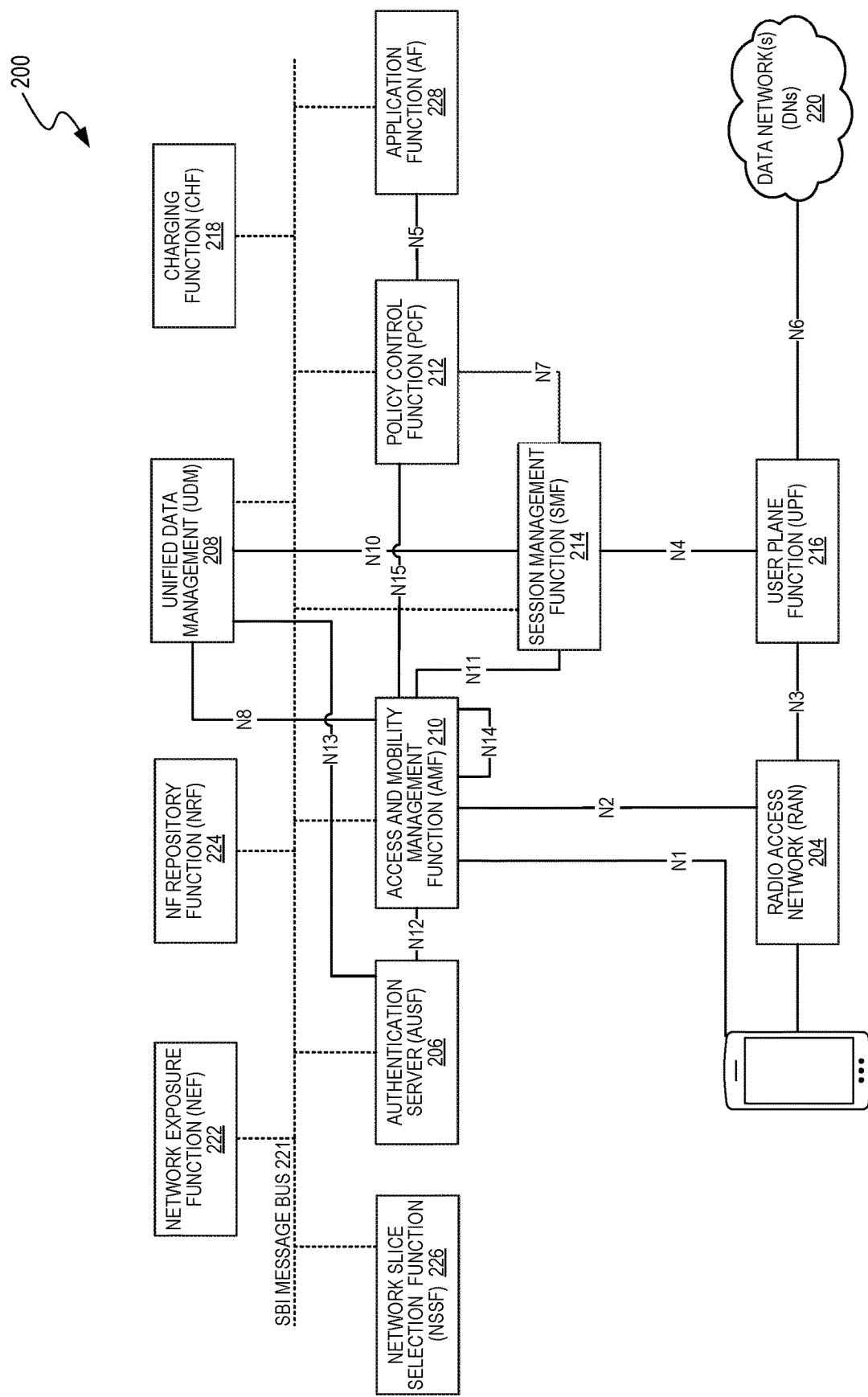
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Location Clustering and Routing for Drive Testing

Figure 3:
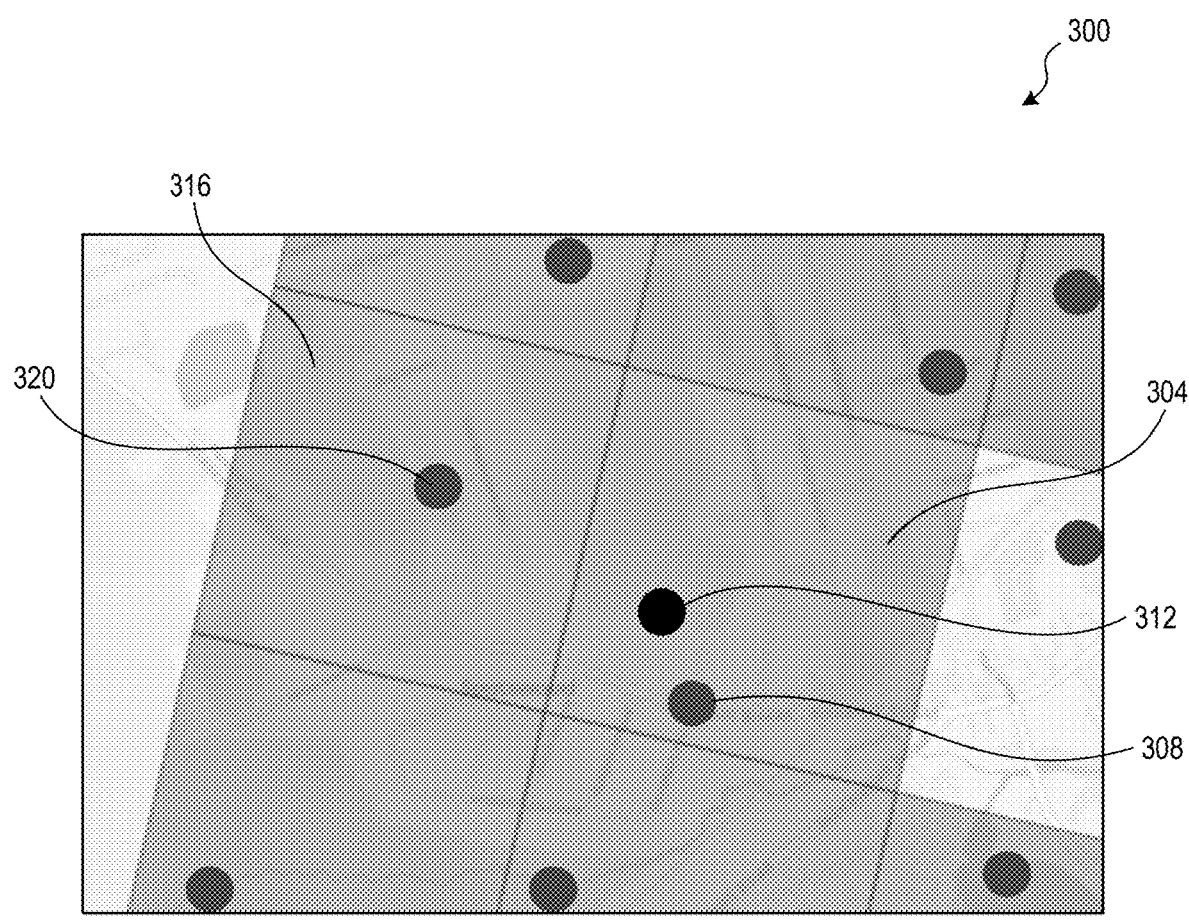
FIG. 3 is a drawing that illustrates example drive test grids.

FIG. 3 is a drawing that illustrates example grids for drive testing of a telecommunications network. The telecommunications network is the same as or similar to network 100, illustrated and described in more detail with reference to FIG. 1. One or more drive testers test radio network signals or radio frequency (RF) signals, typically wireless or cellular signals, by operating vehicles in geographical area 300 to determine network speeds and/or collect data on voice calls using mobile devices. The mobile devices are the same as or similar to the wireless devices 104-1 through 104-7, illustrated and described in more detail with reference to FIG. 1.

To generate a route within geographical area 300 for the drive testers to perform the drive testing, a computer system obtains information describing geographical area 300 from a computer server. The computer system and computer server are implemented using the example computer system 1400 illustrated and described in more detail with reference to FIG. 14. The computer system is operated by a mobile network operator, a wireless carrier, a handset manufacturer, or a third party that specializes in drive testing. The computer server is operated by a mobile network operator, a wireless carrier, a handset manufacturer, a third party that specializes in drive testing, or a government entity (e.g., Federal Communications Commission (FCC)).

Geographical area 300 can be serviced by the telecommunications network. The information obtained can include desired performance metrics for the telecommunications network within geographical area 300. The network performance metrics measured can include latency, jitter, packet loss, throughput, network speed, bandwidth, network availability, packet duplication, packet reordering, user quality of experience, VoIP quality, network congestion, round-trip time (RTT), network utilization, error rate, or transfer control protocol (TCP) retransmission rate.

Geographical area 300 is segmented into multiple grids (e.g., grids 304, 316) across which the telecommunications network is deployed. The grids (sometimes referred to as "polygons") can be equally dimensioned or substantially equally dimensioned. For example, a side of grid 304 can be 500 meters (m) long or can range in length from 490-510 m. In some implementations, the grids are circular, oval or irregularly shaped.

The information obtained from the computer server includes geographic coordinates (e.g., global positioning system (GPS) coordinates) of test locations 312, 320 for performing the drive testing of the telecommunications network. The multiple grids within geographical area 300 include multiple test locations for performing the drive testing. Each test location (e.g., test location 312) is located within a grid (e.g., grid 304). For example, each test location is located at a population centroid of a grid. The population centroid (sometimes referred to as a "mean center") of a grid is a location on which a rigid, weightless map of the grid would balance perfectly, if the people living within the grid are represented as points of equal mass. Mathematically, the centroid is the location to which the population has the smallest possible sum of squared distances. In other examples, a test location is located at a spot known to have weaker network coverage compared to other areas. A test location can also be located in areas where regular events take place and where people would access the telecommunications network.

The computer system determines multiple road locations (e.g., road location 308) corresponding to the test locations based on drivable road data for the grids. A drivable road area and an example drivable road 820 are illustrated and described in more detail with reference to FIG. 8. Each road location (e.g., road location 308) is located on a road or street within a threshold distance from a test location (e.g., test location 312). The threshold distance can be 100 m, 50 m, 25 m, etc. A test location can be located off a road, within a building, on a private road, etc. Therefore, the drive testing is performed at a road location proximate to the test location. In some implementations, the drive testing is performed at a closest possible location on a drivable road (road location) to each test location.

Figure 4:
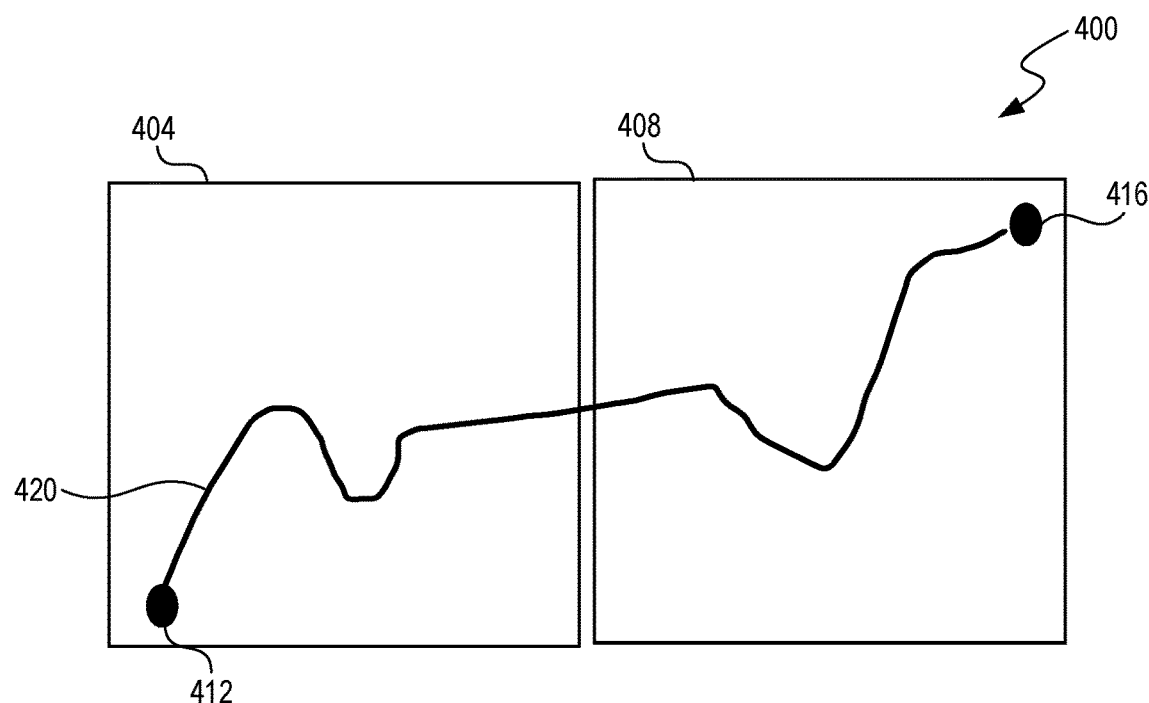
FIG. 4 is a drawing that illustrates route generation for example drive test grids.

FIG. 4 is a drawing that illustrates route generation for drive test grids 404, 408 within geographical area 400 across which a telecommunications network is deployed. As illustrated and described in more detail with reference to FIG. 3, grids 404, 408 include a test location each (not shown in FIG. 4) for drive testing of the telecommunications network. Example test locations 312, 320 are illustrated and described in more detail with reference to FIG. 3. To generate a route for the drive testing, a computer system obtains drivable road data for multiple grids of geographical area 400 (including grids 404, 408), for example, from one or more street networks. A street network contains a set of interconnecting lines and points that represent a system of streets or roads for a given area. The lines and points can be represented by edges and nodes of a graph. A street network provides a foundation for network analysis, routing, determining unroutable test locations, identifying road locations, etc. For example, a street network includes attributes related to traffic flow, limitations on the volume of flow allowed (such as the number of lanes in a road), measurements of resistance to flow or to the speed of flow (such as a speed limit or a forbidden turn direction at a street intersection), or cost accumulated through individual travel along an edge or through a node. A drivable road area and an example drivable road 820 are illustrated and described in more detail with reference to FIG. 8. The computer system is the same as or similar to computer system 1400 illustrated and described in more detail with reference to FIG. 14.

Road locations 412, 416 corresponding to the two test locations within grids 404, 408 are determined using the drivable road data. Each road location is located within a threshold distance from a test location. Example threshold distances are listed in more detail with reference to FIG. 3. A routing application programming interface (API), a route planning API, or a route optimization API can be used to identify a road location within a threshold distance to a test location, or to identify a closest road location to the test location. For example, a routing API receives coordinates of a test location and returns the closest road location. The routing API or route optimization API can use machine learning, for example, as illustrated and described in more detail with reference to FIG. 13, to determine road locations 412, 416 and generate route segment 420.

The computer system identifies and filters out problematic or unroutable grids, test locations, and road locations that could lead to failure in route generation. For example, in response to determining that a particular road location (not shown by FIG. 4) is located on a private road based on the drivable road data, the particular road location is removed from the set of road locations to provide a set of remaining road locations. The particular road location is removed because a drive tester would not be able to access the private road for performing the drive testing. An example unroutable subset 724 of grids is illustrated and described in more detail with reference to FIG. 7. Only the remaining road locations are used for route generation for drive testing.

In some implementations, in response to determining that a particular road location is blocked (e.g., by traffic, construction, an event, or a natural disaster), the particular road location is removed from the set of road locations. If the computer system determines an absence of a drivable road within a particular grid, the particular grid is removed from the set of grids prior to route generation. A drivable route (e.g., including route segment 420) connecting the remaining road locations is generated, using a routing API, for performing the drive testing. The computer system transmits the route to one or more computer devices for performing the drive testing at the remaining road locations in a sequence corresponding to the route. The one or more computer devices are operated by a mobile network operator, a cellular carrier, a drive test provider, etc.

Drive testing at the multiple road locations on a route in a sequence or in an orderly fashion is one of several routing constraints provided by the FCC. The FCC requires that drive testing not be performed in random or ad hoc order. To facilitate the drive testing in a sequence, the implementations disclosed herein generate a specific order of grids while reducing the drive time and distance driven. An output of the route generation (conveyed to the one or more computer devices) is an ordered list of road locations that are sent in a work order to the drive tester teams. A drive tester performs the drive testing of a cluster of road locations based on the order provided in the work order, e.g., road locations for grid #1, grid #2, grid #3, and so forth, and not in any other order. If a drive tester cannot perform drive testing at a particular road location in the field, the drive tester is required to provide a "SKIP" reason and test the other road locations in the same order.

The one or more computer devices are operated by a mobile network operator, a drive test provider, or a cellular carrier. The one or more computer devices can be mobile devices implemented using components of the computer system 1400 illustrated and described in more detail with reference to FIG. 14. In some implementations, the one or more computer devices are part of a computer server used to administer the drive testing. Performing the drive testing can include performing a network speed test at each of the road locations 412, 416. The network speed test is a web-based service that provides an analysis of Internet access performance metrics, such as connection data rate or latency. Performing the drive testing, according to some FCC constraints, can include determining network speeds of the telecommunications network from a vehicle at the road locations while the vehicle is moving. That is, the vehicle must be moving within a grid while performing a network speed test. The vehicle can be an autonomous vehicle or operated by a drive tester.

Performing the drive testing according to the routes generated by the methods described herein reduces greenhouse gas emissions by reducing a number of miles driven by the test vehicles compared to conventional methods or drive testing in an ad hoc manner across the multiple grids. The number of miles driven by test vehicles are reduced because the implementations described herein identify and omit unroutable grids/locations and generate routes specifically to reduce the length of each route. Moreover, route generation is performed such that driving along a route is completable within a specified time period. The time period is specified by a mobile network operator designing the drive test. The drive testing must typically be completable within a specified time period because of the need to conserve limited drive resources (e.g., vehicles and drive testers). The route must typically also be completable without traveling an excessive distance. Further, route generation for drive testing should be efficient, dynamic, and compatible with drive routing software with respect to output file formatting.

Figure 5:
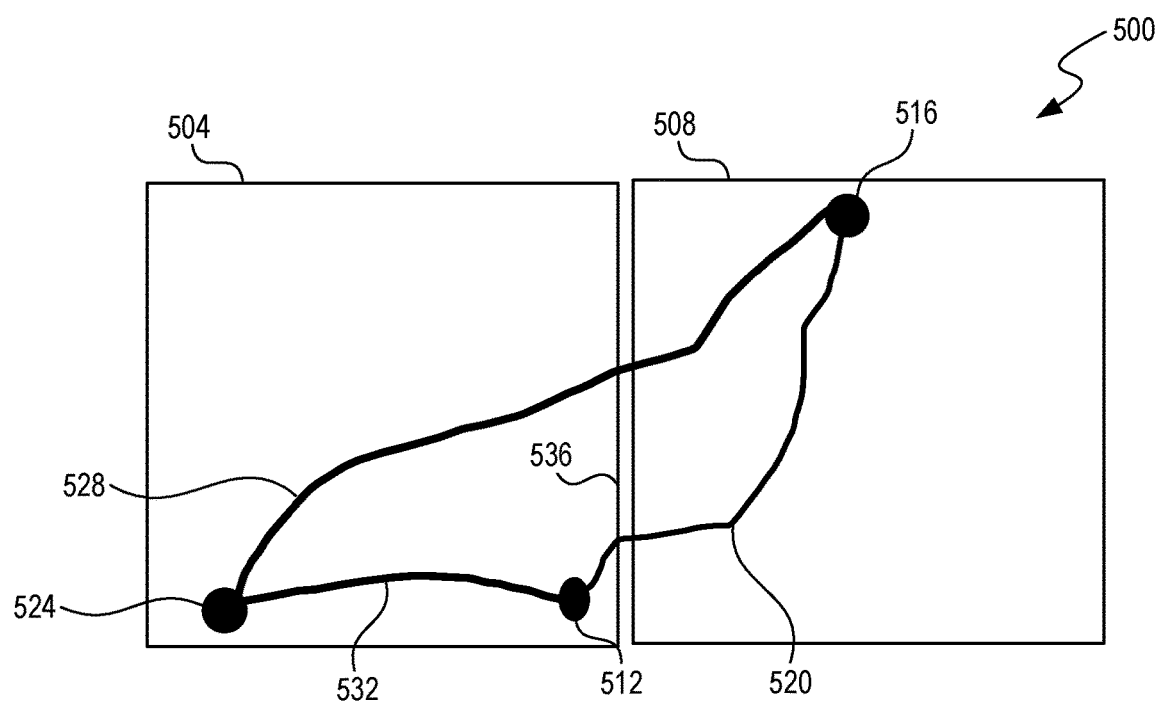
FIG. 5 is a drawing that illustrates intermediate road location insertion for example drive test grids.

FIG. 5 is a drawing that illustrates intermediate road location insertion for example drive test grids. The grids 504, 508 shown by FIG. 5 are similar to or the same as grids 304, 316 illustrated and described in more detail with reference to FIG. 3. To generate a route for grids 504, 508, a computer system obtains information describing multiple grids located in geographical area 500 across which a telecommunications network is deployed. The information can include performance metrics for the telecommunications network within geographical area 500. The computer system and computer server are the same as or similar to the computer systems and computer servers described in more detail with reference to FIGS. 3, 4. Each grid 504, 508 includes a test location (not shown by FIG. 5) for performing drive testing of the telecommunications network.

The computer system determines a road location (e.g., road locations 512, 516) within each grid 504, 508 based on drivable road data. A drivable road area and an example drivable road 820 are illustrated and described in more detail with reference to FIG. 8. Each road location is located proximate to a corresponding test location. For example, road location 512 is located within 100 m, 50 m, or 25 m of a corresponding test location. In response to determining that route segment 520 passing through road location 512 located within grid 504 would violate a routing constraint, an intermediate road location 524 is inserted within grid 504 to meet the routing constraint. For example, an FCC constraint instructs that a route from a road location within a grid must not pass through a side (e.g., side 536) of the grid that is closest to the road location. After insertion of intermediate road location 524, the route generated includes route segments 532, 528 to drive from road location 512 to road location 524 to road location 526. The drivable route includes the intermediate road location 524. In some implementations, the computer system determines an amount of time needed to complete traveling along the route (e.g., including segments 532, 528) and a length of the route. The time needed and length can be determined using route planning software, enabling the computer system to determine available directions through driving. For example, a routing API or route planning software generates a route to avoid traffic between road locations 512, 524, 516.

Figure 6:
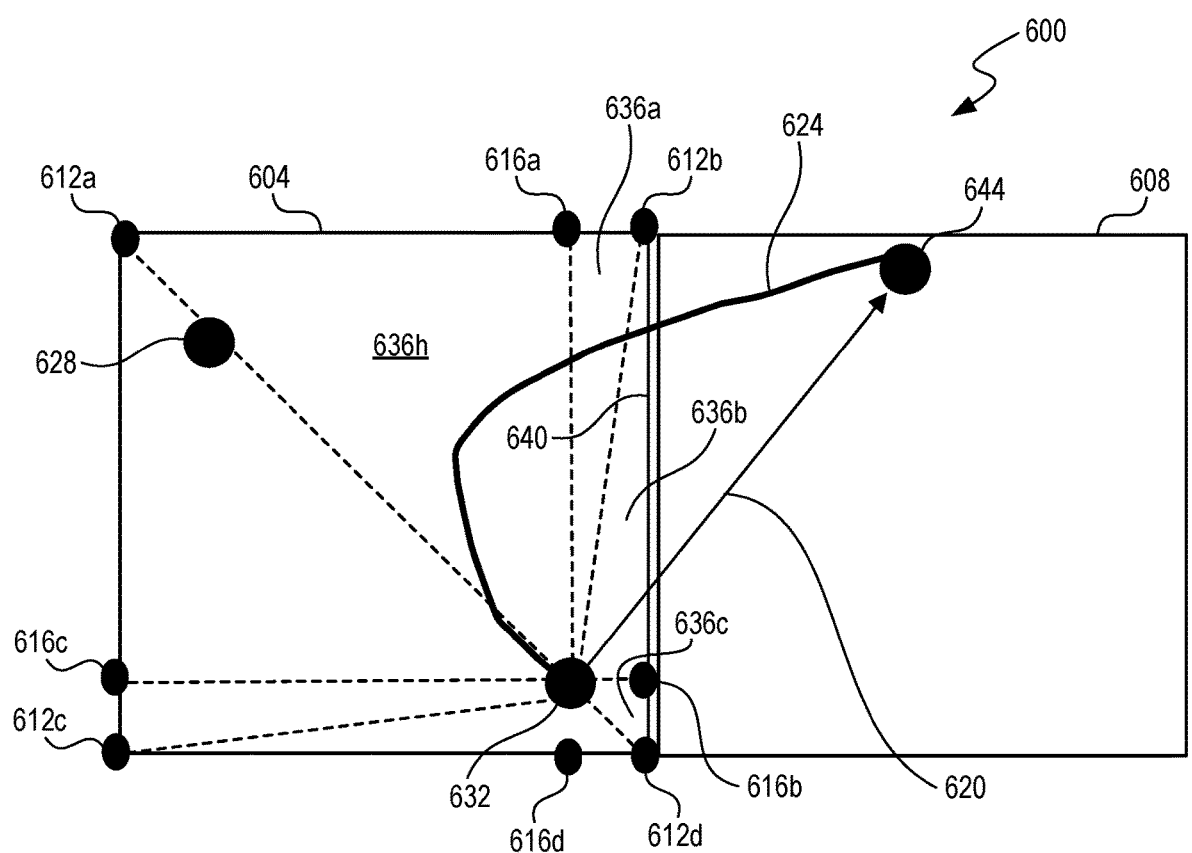
FIG. 6 is a drawing that illustrates intermediate road location insertion for example drive test grids.

FIG. 6 is a drawing that illustrates intermediate road location insertion for example drive test grids located within geographical area 600. As described in more detail with reference to FIGS. 3-5, a computer system obtains information describing multiple grids across which a telecommunications network is deployed as well as drivable road data for the multiple grids. A drivable road area and an example drivable road 820 are illustrated and described in more detail with reference to FIG. 8. Based on the drivable road data, the computer system determines a first road location 632 within a first grid 604 of the multiple grids and a second road location 644 within a second grid 608 of the multiple grids for performing drive testing of the telecommunications network.

The computer system determines that route segment 624 (from the first road location 632 to the second road location 644) for performing the drive testing would pass through side 640 of the first grid 604 that is located within a threshold distance from the first road location 632. The threshold distance can be 250 m, 100 m, 75 m, etc. An FCC constraint (described in more detail with reference to FIG. 5) would thus be violated. In some implementations, to determine that route segment 624 would violate the FCC constraint, the computer system determines a set of projections 616*a-d* of the first road location 632 on sides (including side 640) of the first grid 604. Coordinates of corners 612*a-d* of the first grid 604 are extracted. The computer system determines bearings from the first road location 632 to projections 616*a-d* and the coordinates. The bearings provide directions given as the primary compass direction (north or south), degree of angle, and east or west designations. A bearing describes a line as heading north or south, and deflected some number of degrees toward the east or west.

To determine that route segment 624 would violate the FCC constraint, the computer system determines a set of zones 636*a*, 636*b*, 636*c*, . . . , 636*h* of the first grid 604. The set of zones 636*a*, 636*b*, 636*c*, . . . , 636*h* is identified based on the bearings to provide a determination that route segment 624 will pass through side 640 of the first grid 604 that is located within the threshold distance from the first road location 632. To determine that route segment 624 will pass through side 640, the computer system determines a second bearing from the first road location 632 to the second road location 644. Based on comparing the second bearing to the set of zones 636*a*, 636*b*, 636*c*, . . . , 636*h*, a particular zone (e.g., zone 636*b* as shown by FIG. 6) is identified that line 620 from the first road location 632 to the second road location 644 will pass through.

An intermediate road location 628 within the first grid 604 is inserted to meet the constraint. Side 640 of the first grid 604 is spaced further than the threshold distance from the intermediate road location 628. In some implementations, inserting the intermediate road location 628 is performed prior to generating the route. A route is generated including multiple road locations and passing through the first road location 632, the intermediate road location 628, and the second road location 644 in order. The multiple road locations include the first road location 632, the intermediate road location 628, and the second road location 644. In other implementations, a preliminary route is generated to determine potential violation of routing constraints. Intermediate road location is performed after the potential violations are identified, and a final route is generated for drive testing.

Figure 7:
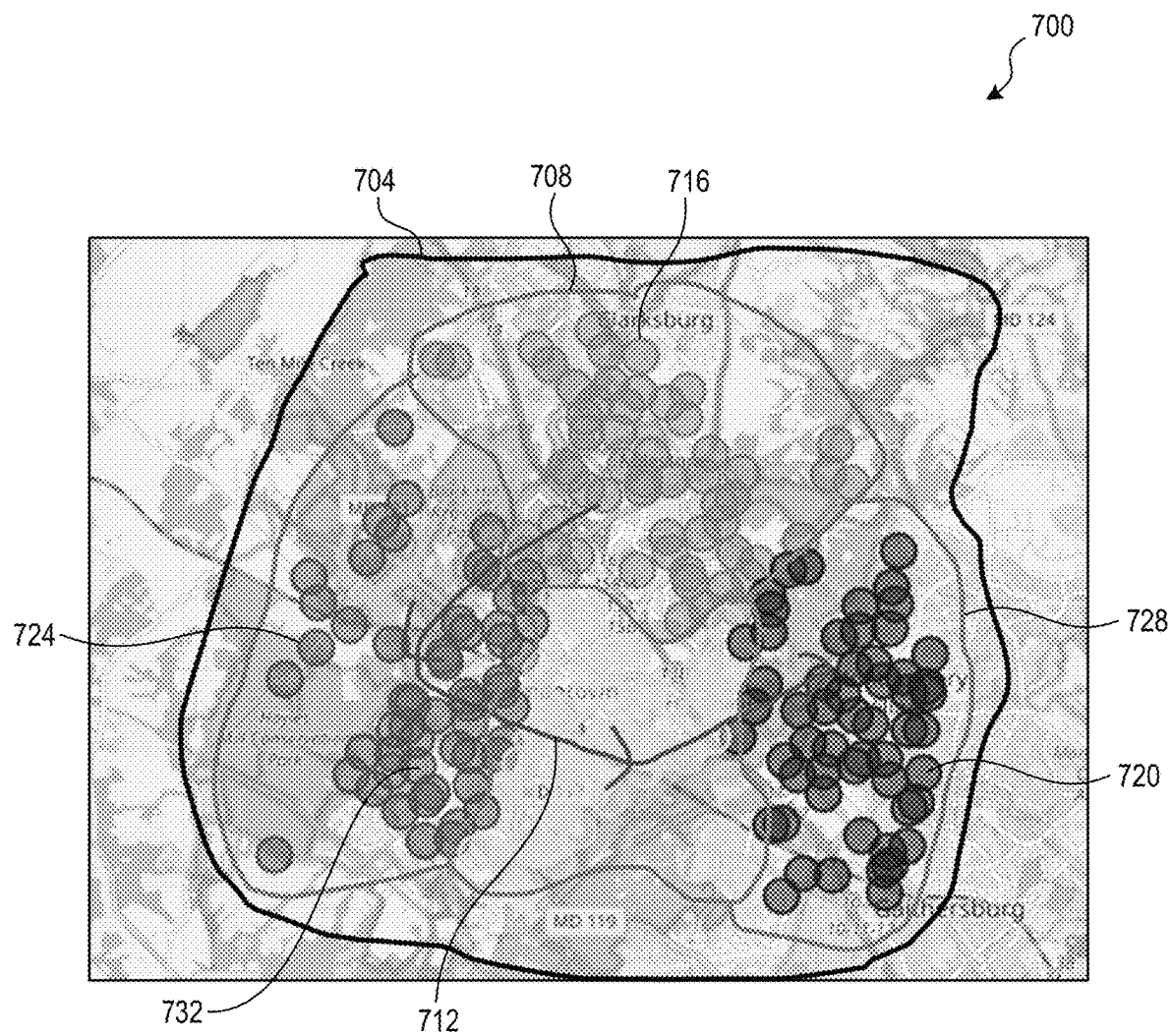
FIG. 7 is a drawing that illustrates grid clustering for example drive test grids.

FIG. 7 is a drawing that illustrates grid clustering for example drive test grids. The example drive test grids lie within boundary 704 of geographical area 700. Prior to route generation for drive testing of geographical area 700, multiple grids and multiple test locations are generated by segmenting geographical area 700. Example grids 304, 316 and example test locations 312, 320 are illustrated and described in more detail with reference to FIG. 3. A computer system groups the multiple grids into multiple clusters. The computer system is the same as or similar to the computer systems described in more detail with reference to FIGS. 3-6. Example clusters 716, 720, 732 of grids are shown by FIG. 7. The grouped circles represent road locations in geographical area 700. In some implementations, the test locations within each cluster range in number from 100 to 300. In some implementations, the test locations within each cluster are about 200 because drive testing for about 200 road locations can be performed by a drive tester in a day.

In some implementations, the clustering is performed using machine learning. Machine learning is illustrated and described in more detail with reference to FIG. 13. For example, the machine learning performed by the computer system uses a k-means algorithm. K-means clustering is a method of vector quantization that partitions N grids into K clusters in which each grid belongs to the cluster having the nearest mean, serving as a prototype of the cluster. The value of K can be 500, 1000, 10,000, etc. In some examples, constrained k-means clustering is used. In constrained k-means clustering, the computer system specifies a minimum and/or maximum size for each cluster. For example, the minimum size can be 180, 185, 190, etc. the maximum size can be 205, 210, 215, etc. The constrained k-means implementation modifies the cluster assignment by formulating it as a Minimum Cost Flow (MCF) linear network optimization problem. The clusters generated can range in number, K, from 10,000 to 20,000. Grouping or clustering the N grids can also be performed using unsupervised learning. Unsupervised learning learns patterns from untagged data and unlabeled datasets. The computer system builds a concise representation of the grids and then generates content such as clusters from the representation.

The clustering is performed prior to route generation to prevent a route segment being generated between disparate portions of geographical area 700. For example, if there is an interstate highway between a road location on the northern end of geographical area 700 and a road location on the eastern end of geographical area 700, the routing API could generate a route repeatedly going back and forth from north to east, thus increasing the number of miles driven and the greenhouse gases generated. Generation of clusters 716, 720, 732 with an instruction to the routing API to route within each cluster of grids prior to routing another cluster provides that geographically proximate grids are routed together, thus reducing the number of miles driven, fuel consumption, and greenhouse gas generation compared to traditional methods. For example, generated route segment 712 within the overall route goes from cluster 732 to cluster 720.

In some implementations, a size of each cluster is greater than a first threshold size and less than a second threshold size. A first threshold size is 190, 192, 194, etc. A second threshold size can be 206, 208, or 210. For example, a brute force programming approach (by progressively increasing the first threshold size and decreasing the second threshold size) is employed until an equilibrium is obtained to provide the clusters. A target cluster size of 200 grids can be used. Different threshold size pairs, e.g., (199,201), (198,202) are input until error-free clustering is achieved. In some examples, threshold size pairs such as (195,205) are used to trade off execution time for achieving a cluster size as close as possible to a target cluster size, e.g., 200.

Each cluster 716, 720, 732 includes grids that are geographically proximate to each other, such that the routing API routes geographically proximate grids are routed together, and that route segments between road locations are shorter compared to traditional methods. For each cluster the computer system can generate a boundary (e.g., boundaries 708, 728) for drive testing of the telecommunications network within geographical area 700.

For each cluster 716, 720, 732 the computer system generates a route segment connecting one or more road locations within the one or more grids of the cluster to provide multiple route segments. An example of such a route segment 420 is illustrated and described in more detail with reference to FIG. 4. A route connecting the multiple route segments is generated for performing the drive testing. Driving in accordance with the route prevents traveling directly between remote road locations. For example, the computer system generates the route connecting the multiple route segments to prevent generating route segments directly connecting remote road locations.

The computer system sends information describing the route, clusters, test locations, and/or road locations within each cluster to one or more computer devices. The information can include geographic boundaries 704, 708. The one or more computer devices are similar to the one or more computer devices described in more detail with reference to FIG. 4. The information is for performing drive testing to determine network performance of the telecommunications network at the road locations proximate to the test locations. For example, the computer system and/or the one or more computer devices determine whether the measured network performance matches expected/desired performance metrics.

In some implementations, drive testing is performed to determine network speeds of a second telecommunications network operated by a second mobile network operator across geographical area 700. In such a scenario, the telecommunications network described with reference to FIGS. 3-6 is a first telecommunications network operated by a first mobile network operator and the drive testing described with reference to FIGS. 3-6 is performed to determine first network performance. For each cluster 716, 720, the computer system generates commands for a vehicle to drive proximate to the test locations in accordance with the commands and measure second network performance of the second telecommunications network proximate to the test locations. The vehicle can be an autonomous vehicle or a vehicle operated by a drive tester. Driving proximate to the test locations in accordance with the commands reduces a number of miles driven by the vehicle for measuring the second network performance compared to ad hoc driving according to the multiple grids.

In some implementations, any of the machine learning methods described herein can be used to identify, group, and remove an unroutable subset 724 of grids from consideration based on the drivable road data. A drivable road area and an example drivable road 820 are illustrated and described in more detail with reference to FIG. 8. The computer system removes unroutable subset 724 to provide a routable subset of the multiple grids. Machine learning is used to group the routable subset of grids into multiple clusters. Each cluster includes one or more grids of the routable subset. To remove unroutable subset 724, the computer system clusters grids in the unroutable subset from the multiple grids based on the drivable road data using machine learning. The unroutable subset 724 can have a grid lacking a drivable road, a road location located on a private or otherwise inaccessible road, a test location located on a boundary of a grid, or a road location blocked as described in more detail with reference to FIG. 4.

When a test location is located on a boundary of a first grid, a third-party routing API, if used, can sometimes cause errors in routing. A workaround can be used to move the test location off the boundary and into the first grid. The errors in routing can be caused when the third-party routing API identifies a road location corresponding to the test location. For example, the road location may be identified on a street in an adjacent second grid, leading to incorrect routing and testing. To solve this issue, the embodiments disclosed herein verify each test location against the grid that the test location is supposed to be within and determine whether the test location is on a grid boundary. If the test location is on a grid boundary, the test location can be removed from consideration or a new test location is identified within the grid. A corresponding road location is also identified inside the grid.

To identify unroutable grids, test locations, or road locations (e.g., in unroutable subset 724), the computer system identifies at least one routable road location from the initial set of multiple road locations. The routable road location is sometimes referred to as an "anchor location." Multiple route segments from the routable road location are generated to each other road location for determining routability of each other road location. In response to determining failure of generating a route segment from the routable road location to another road location, the other road location is removed from consideration to provide a set of remaining road locations. The computer system can determine a failure when generating a route segment, if a grid lacks a drivable road, a road location is located on a private road, a test location is identified to be on a boundary of a grid, or a road location is blocked. The computer system generates a route connecting the routable road location and the remaining road locations for performing the drive testing.

In some implementations, the computer system obtains information from a computer server describing multiple first clusters. For example, geographical area 700 can be segmented into multiple first clusters based on market boundaries, performance tier boundaries, service areas, etc. A first cluster can include 15,000 grids, 10,000 grids, or 1000 grids. In some examples, geospatial analysis of geographical area 700 is performed to identify test locations located within geographical area 700. Geospatial analysis is the gathering, display, and manipulation of imagery, GPS, satellite photography and historical data, described explicitly in terms of geographic coordinates or implicitly, in terms of a street address, postal code, or forest stand identifier as they are applied to geographic models. Each test location is located within a grid. The computer system can overlay boundaries of the first clusters on the test location coordinates to determine the grids located within each first cluster.

For more efficient route generation compared to traditional methods, the computer system recursively segments each first cluster into multiple, smaller second clusters until a difference between a number of grids located within each second cluster and a target number of grids is less than a threshold number of grids. The recursive segmentation process calls itself with smaller input values (second clusters) and returns the result for the current input (first clusters) by carrying out basic operations on the returned value for the smaller input. The recursive segmentation enables solutions to smaller instances of the clustering problem. The target number of grids can be 200, 210, 220, etc. The threshold number of grids can be 30, 20, 10, etc. In some implementations, recursive segmentation of each first cluster into multiple second clusters is performed until a difference between a number of test locations within each second cluster and a target number of test locations is less than a threshold number of test locations. The target number of test locations can be 200, 210, 220, etc. The threshold number of test locations can be 30, 20, 10, etc.

The recursive segmenting of each first cluster can be performed using a constrained k-means algorithm, unsupervised learning, hierarchical clustering, or deep learning. Hierarchical clustering, also known as hierarchical cluster analysis, groups similar grids in a first cluster into second clusters. For example, the grids can be grouped based on geographical proximity or proximity of test locations, or based on having a common road running through the grids. The endpoint is a set of second clusters, where each second cluster is distinct from each other second cluster, and the grids within each second cluster are similar to each other. Deep-learning architectures such as deep neural networks, deep belief networks, deep reinforcement learning, recurrent neural networks, convolutional neural networks and transformers can also be used for the recursive segmentation. Deep learning refers to the use of multiple layers in the machine learning network. For example, a machine learning network with a nonpolynomial activation function with one hidden layer of unbounded width can be used as a universal classifier. In deep learning the layers are permitted to be heterogeneous and to deviate from connectionist models, to improve efficiency, trainability and understandability.

In some examples, recursively segmenting each first cluster is performed using density-based spatial clustering of applications with noise (sometimes referred to as DBSCAN). Density-based spatial clustering of applications with noise is a data clustering non-parametric algorithm. Given a set of test locations or grid coordinates, DBSCAN groups together locations that are closely packed (e.g., road locations having many nearby neighbors) into a second cluster, marking as outliers road locations that lie in low-density regions (whose nearest neighbors are too far away).

The grids located within each second cluster are geographically proximate, enabling more efficient route generation and avoiding a route that would cause a vehicle to repeatedly drive between disparate portions of geographical area 700. The grids and test locations located within each second cluster are identified. The computer system transmits information describing the grids and test locations located within each second cluster to one or more computer devices for performing drive testing of the telecommunications network at road locations proximate to the test locations. Multiple vehicles can be used for performing the drive testing, for example, one vehicle per second cluster. The recursive segmenting of the first clusters reduces greenhouse gas emissions by reducing a number of miles driven by the multiple vehicles compared to ad hoc driving according to the multiple first clusters.

Figure 8:
FIG. 8 is a drawing that illustrates location clustering and routing for drive testing.

FIG. 8 is a drawing that illustrates location clustering and routing for drive testing. In particular, FIG. 8 shows example output 800 from an automated routing tool that implements methods and features disclosed herein. The automated routing tool generates routes for location clusters and drive testing. In some implementations, the automated routing tool is hosted on a virtual machine. The virtual machine is a virtualization or emulation of a computer system, for example, the computer system 1400 illustrated and described in more detail with reference to FIG. 14. The virtual machine provides functionality of a physical computer and can communicate with specialized hardware, software, or a combination.

FIG. 8 shows a graphical representation of drivable road data for a geographical area as well as an example drivable road 820. The drivable road data is used to determine whether a feasible route exists and limit the search of drivable route segments. Road 820 is a public street that connects two or more road locations. Road 820 can be a smaller small side street, have buildings on both sides, or run perpendicular to other roads. Road 820 can be a wider city street that has trees and vegetation on both sides of it, have a median, or can be a narrower lane in a rural area. Road 820 can be a longer winding road that has its route shaped by its environment, a street that follows the top of a slope, or a street that has no throughway. Road 820 can lead to a dead end or be a street that ends in a circle or loop.

Example output 800 shown by FIG. 8 is a plot that illustrates route 804 generated when the automated routing tool receives a list of grids (e.g., grid 816) and/or test locations as input. Road location 808 is an example road location determined by the automated routing tool. Road location 812 is an example additional intermediate road location inserted by the automated routing tool, for example, to meet FCC guidelines/constraints as illustrated and described in more detail with reference to FIGS. 5-6.

Figure 9:
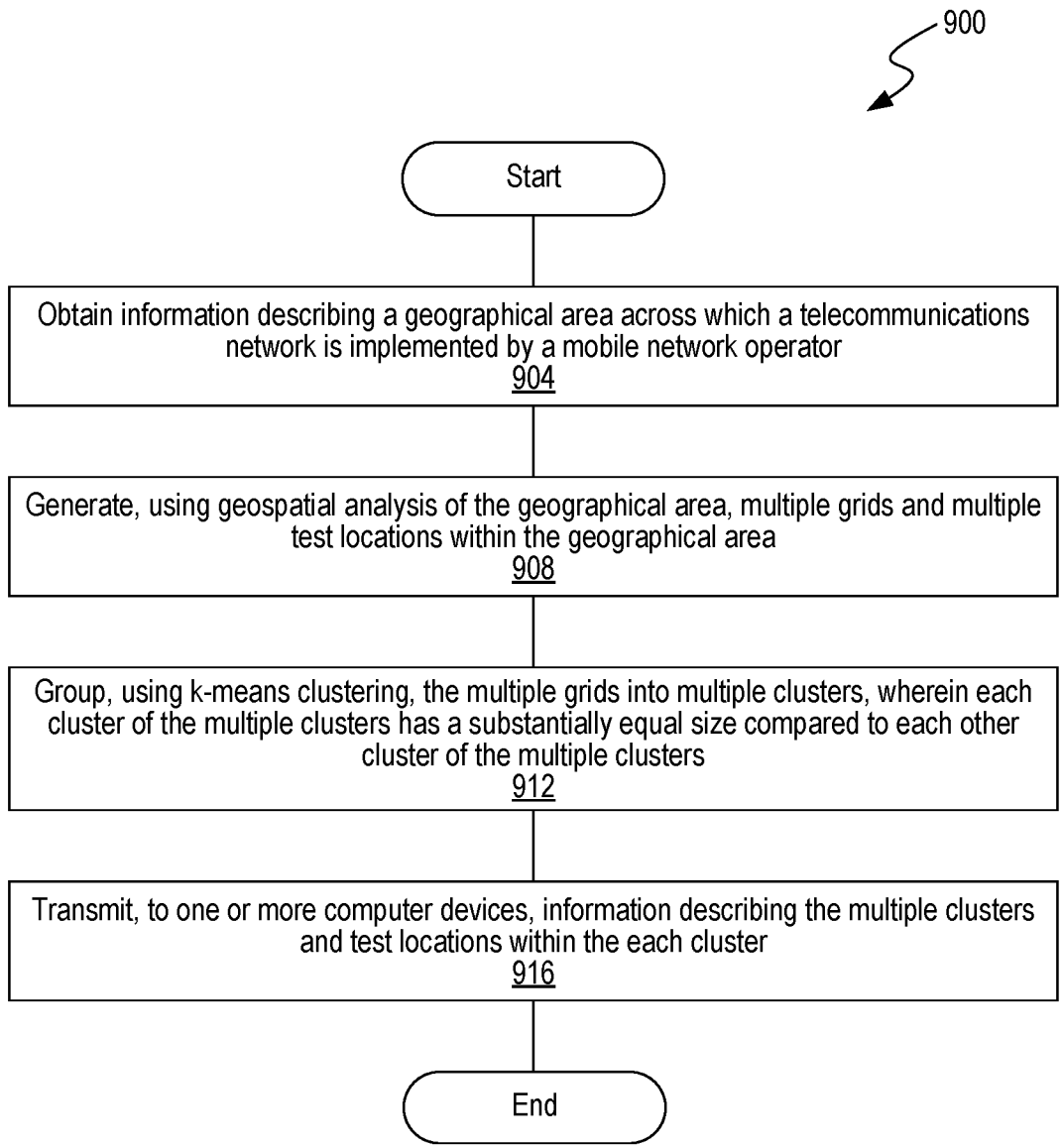
FIG. 9 is a flowchart that illustrates an example process for location clustering and routing for drive testing.

FIG. 9 is a flowchart that illustrates an example process for location clustering and routing for drive testing. In some implementations, the process is performed by the automated routing tool described in more detail with reference to FIG. 8. In some implementations, the process is performed by a computer system, e.g., the example computer system 1400 illustrated and described in more detail with reference to FIG. 14. Particular entities, for example, a computer server, one or more computer devices, or a mobile device within a vehicle perform some or all of the steps of the process in other implementations. The computer server, the one or more computer devices, and the mobile device can be implemented by the example computer system 1400 illustrated and described in more detail with reference to FIG. 14. Likewise, implementations can include different and/or additional steps or can perform the steps in different orders.

In act 904, a computer device or a computer system obtains information describing a geographical area across which a telecommunications network is implemented or operated by a mobile network operator. An example geographical area 700 having boundary 704 is illustrated and described in more detail with reference to FIG. 7. Boundary 704 delineates a specific area for a drive tester to operate within. For example, boundary 704 can be provided to a specific drive test team for performing drive testing.

In act 908, the computer device generates, using geospatial analysis of the geographical area, multiple grids and multiple test locations within the geographical area. Geospatial analysis is described in more detail with reference to FIG. 7. Each grid can have substantially equal dimensions compared to each other grid of the multiple grids. For example, a side of grid 304 can be 500 m long or can range in length from 490-510 m. In some implementations, an area of each grid is in a range from 1,000 square meters ($m^2$) to 5,000 $m^2$. The multiple test locations can range in number from 2 million to 4 million.

In act 912, the computer device groups, using k-means clustering, the multiple grids into multiple clusters. K-means clustering and other clustering methods are described in more detail with reference to FIG. 7. Each cluster of the multiple clusters has a substantially equal size compared to each other cluster of the multiple clusters. For example, a cluster can have 195, 200, 205 grids. In some examples, a difference between a number (e.g., 195, 200, or 205) of grids located within each cluster and a target number of grids (e.g., 200) is less than a threshold number (e.g., 10, 15, or 20) of grids. Each cluster includes grids that are geographically proximate, for example, a spacing between grids is less than a threshold distance. The threshold distance can be 1 mile, 2 miles, 10 miles, etc.

In act 916, the computer device transmits, to one or more other computer devices, information describing the multiple clusters and test locations within each cluster. For example, the information includes a route. The information is for determining whether the measured network performance of the telecommunications network proximate to the test locations is within a threshold value of expected/desired performance metrics. The threshold value can be 5 Mbps, 10 Mbps, 15 Mbps, etc. The threshold value can be 5 milliseconds (ms), 10 ms, 15 ms, etc. In some implementations, the computer device generates commands or directions for a vehicle to drive proximate to the test locations within each cluster in accordance with the information.

The vehicle uses a mobile device to measure network performance of the telecommunications network proximate to the test locations. Driving proximate to the test locations in accordance with the information reduces greenhouse gas emissions by the vehicle compared to ad hoc driving according to the multiple grids. The computer system can generate commands for a vehicle or a drive tester to measure network latencies, network upload bandwidths, or network download bandwidths at the test locations. A network latency is a delay in network communication, determining a time for data to transfer across the telecommunications network. The network upload bandwidth and network download bandwidth refer to the capacity of the telecommunications network to upload and download data. The bandwidths are the maximum volume of information that can be sent or received in a measured amount of time, typically determined in megabits per second (Mbps).

Figure 10:
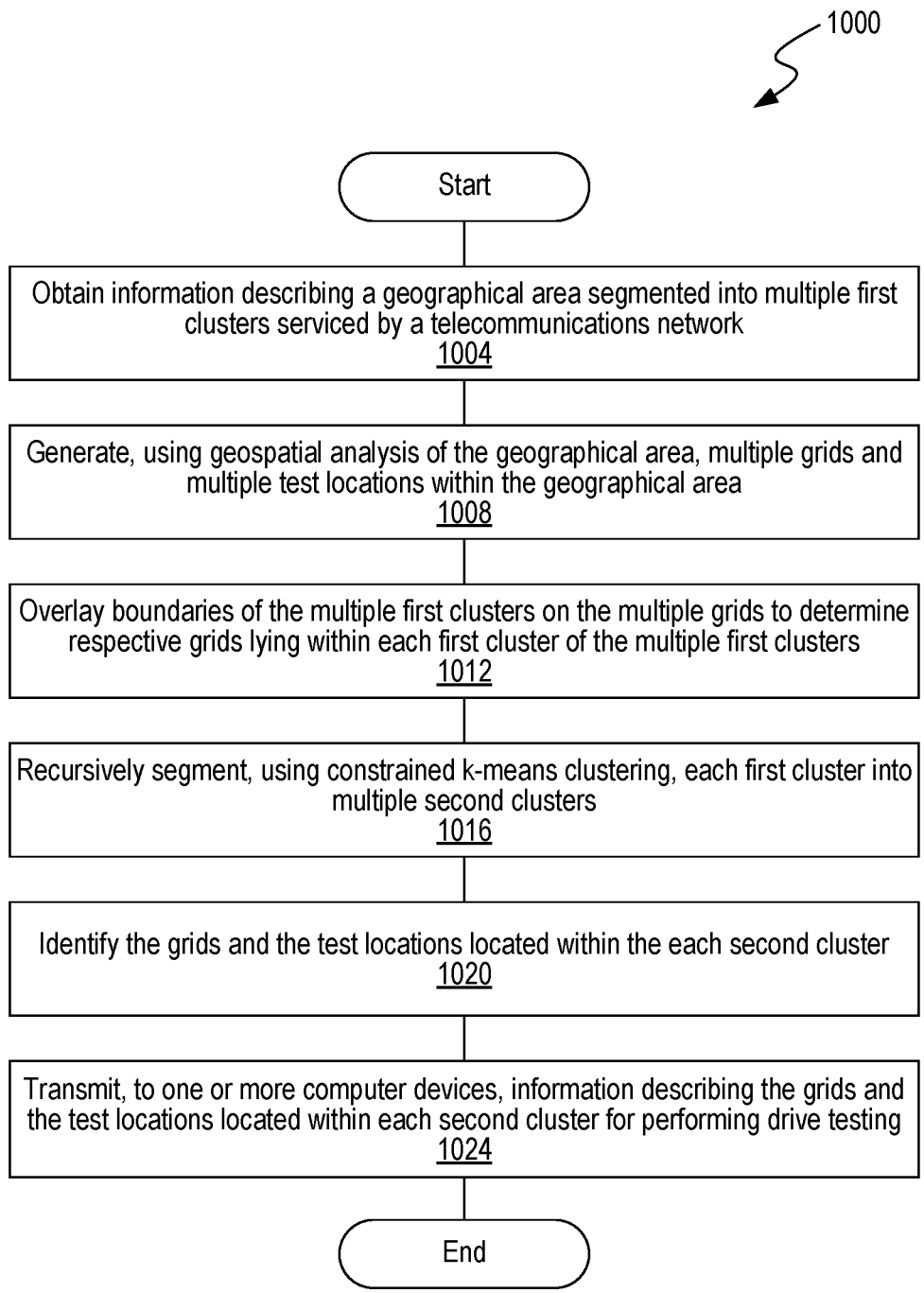
FIG. 10 is a flowchart that illustrates an example process for location clustering and routing for drive testing.

FIG. 10 is a flowchart that illustrates an example process for location clustering and routing for drive testing. In some implementations, the process is performed by the automated routing tool described in more detail with reference to FIG. 8. In some implementations, the process is performed by a computer system, e.g., the example computer system 1400 illustrated and described in more detail with reference to FIG. 14. Particular entities, for example, a computer server, one or more computer devices, or a mobile device within a vehicle perform some or all of the steps of the process in other implementations. The computer server, the one or more computer devices, and the mobile device can be implemented by the example computer system 1400 illustrated and described in more detail with reference to FIG. 14. Likewise, implementations can include different and/or additional steps or can perform the steps in different orders.

In act 1004, a computer device obtains, from a computer server, information describing a geographical area segmented into multiple first clusters serviced by a telecommunications network. An example geographical area 700 segmented into example clusters 716, 720 is illustrated and described in more detail with reference to FIG. 7. The geographical area can be a county, a state, or a country.

In act 1008, the computer device generates, using geospatial analysis of the geographical area, multiple grids and multiple test locations within the geographical area. Geospatial analysis is described in more detail with reference to FIG. 7. Example grids 304, 316 and example test locations 312, 320 are illustrated and described in more detail with reference to FIG. 3. The information described with reference to act 1004 can include a latitude and a longitude of each test location. In some implementations, each grid of the multiple grids has substantially equal dimensions compared to each other grid of the multiple grids. For example, a side of grid 304 can be 500 m long or can range in length from 490-510 m. Each test location of the multiple test locations is located within a grid of the multiple grids. In some implementations, each test location is located at a population centroid of the grid.

In act 1012, the computer device overlays boundaries of the multiple first clusters on the multiple grids to identify which grids lie within each first cluster of the multiple first clusters. The first clusters can describe county lines, market boundaries, or portions of the geographical area classified according to network performance tiers.

In act 1016, the computer device recursively segments each first cluster into multiple second clusters until a difference between a number of grids located within each second cluster and a target number of grids is less than a threshold number of grids. Example target numbers and threshold numbers are described in more detail with reference to FIG. 7. In some implementations, k-means clustering or constrained k-means clustering is used. K-means clustering and other machine learning methods that can be used to perform the clustering are described in more detail with reference to FIGS. 7 and 13.

In act 1020, the computer device identifies the grids and the test locations located within each second cluster. Each second cluster can have a substantially equal size compared to each other second cluster. For example, a second cluster can have 195, 200, or 205 grids. Parameters such as the target number of grids and the threshold number of grids can be dynamically modified during the clustering process to improve efficiency, route lengths, other metrics, or a combination thereof.

In act 1024, the computer device transmits, to one or more other computer devices, information describing the grids and the test locations located within each second cluster. The information is for performing drive testing to determine network performance of the telecommunications network proximate to the test locations. In some implementations, the computer device generates a boundary of each second cluster for performing the drive testing. The transmitted information includes coordinates corresponding to the boundaries. Example cluster boundaries 708, 728 are illustrated and described in more detail with reference to FIG. 7. Multiple vehicles can be used for performing the drive testing. Recursively segmenting each first cluster balances a number of miles driven across the multiple vehicles. For example, instead of a first vehicle driving 40 miles per day and another driving 800 miles, using the embodiments disclosed herein the first vehicle would drive 380 miles and the second vehicle would drive 420 miles.

Recursively segmenting each first cluster also reduces greenhouse gas emissions by reducing a number of miles driven by the multiple vehicles compared to conventional methods or driving in an ad hoc manner according to the multiple grids. In some implementations, a graphical representation of the multiple second clusters is generated or displayed on an electronic display of at least one of the one or more computer devices. The graphical representation is similar to the output shown by FIG. 8. Display device 1418, illustrated and described in more detail with reference to FIG. 14, can be used for display.

Figure 11:
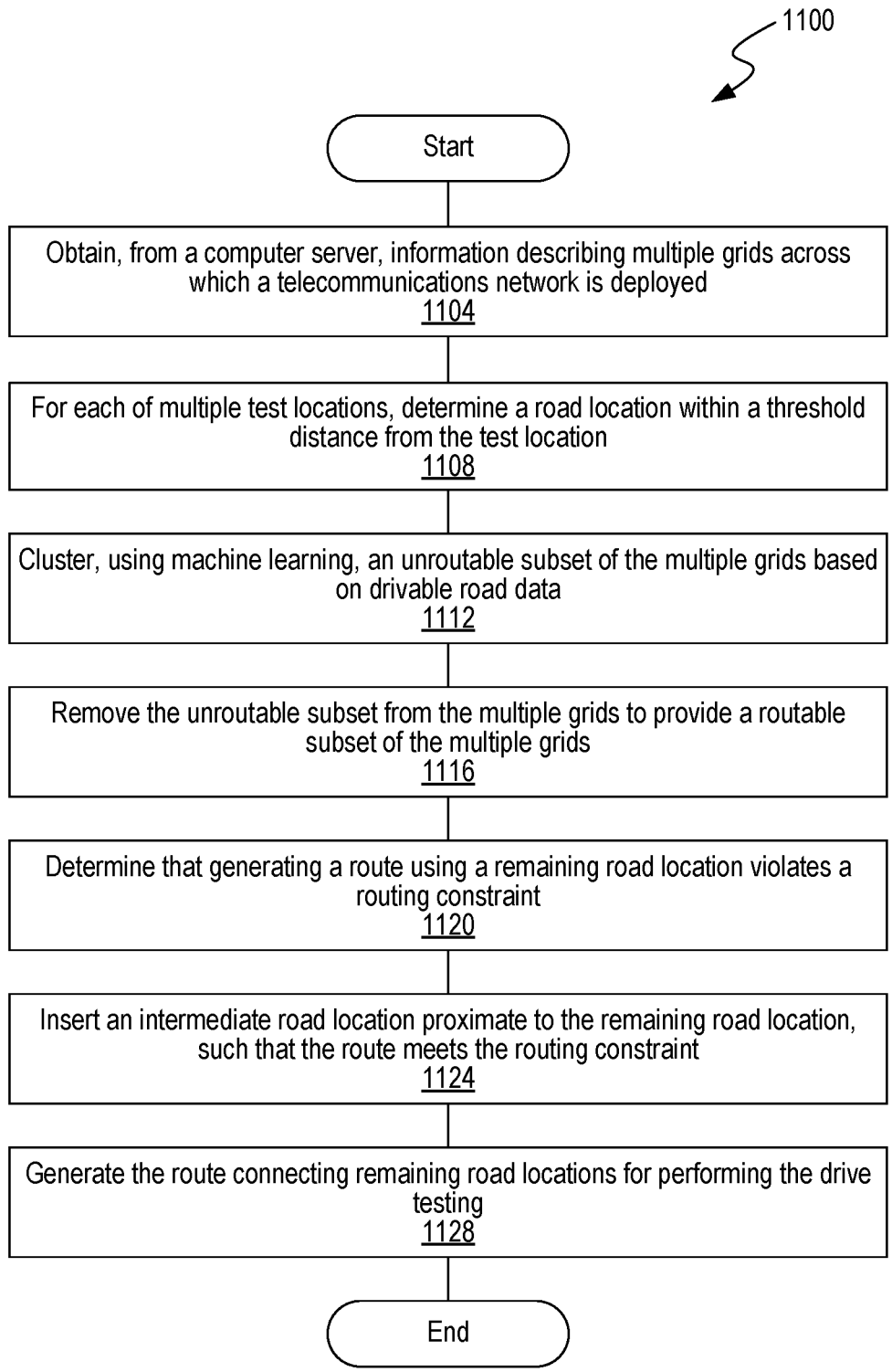
FIG. 11 is a flowchart that illustrates an example process for location clustering and routing for drive testing.

FIG. 11 is a flowchart that illustrates an example process for location clustering and routing for drive testing. In some implementations, the process is performed by the automated routing tool described in more detail with reference to FIG. 8. In some implementations, the process is performed by a computer system, e.g., the example computer system 1400 illustrated and described in more detail with reference to FIG. 14. Particular entities, for example, a computer server, one or more computer devices, or a mobile device within a vehicle perform some or all of the steps of the process in other implementations. The computer server, the one or more computer devices, and the mobile device can be implemented by the example computer system 1400 illustrated and described in more detail with reference to FIG. 14. Likewise, implementations can include different and/or additional steps or can perform the steps in different orders.

In act 1104, a computer device obtains, from a computer server, information describing multiple grids across which a telecommunications network is deployed. The multiple grids include multiple test locations for drive testing of the telecommunications network. Example grids 304, 316 and example test locations 312, 320 are illustrated and described in more detail with reference to FIG. 3.

For each of the multiple test locations, in act 1108, the computer device determines a road location within a threshold distance from the test location. Each road location is located on a road or street within a threshold distance from a test location. A test location can be located off a road, within a building, on a private road, etc. In some implementations, the drive testing is performed at a closest possible location on a drivable road (road location) to each test location. An example road location 308 is illustrated and described in more detail with reference to FIG. 3.

In act 1112, the computer device identifies and clusters, using machine learning, an unroutable subset of the multiple grids based on drivable road data. To perform the clustering, unroutable grids are identified as those grids lacking a drivable road, grids where road locations are located on private roads, grids where test locations are located on a grid boundary, or grids where road locations are blocked. The identification and clustering process can use any of the machine learning methods described herein. In some implementations, the machine learning uses k-means clustering or unsupervised learning. An example unroutable subset 724 of grids is illustrated and described in more detail with reference to FIG. 7.

In act 1116, the computer device removes the unroutable subset from the multiple grids to provide a routable subset of the multiple grids. Each grid in the routable subset can be part of the eventual route used for drive testing. The routable subset includes remaining road locations. In some implementations, to determine road locations from test locations, the road network within each grid is filtered and a closest road point to each test location is identified. The road locations are used for route generation to ensure that a vehicle performing drive testing remains on a publicly accessible street. The road locations are also used to estimate the length of the route and the time required to complete the route.

In act 1120, the computer device determines that a route segment passing through a remaining road location would violate a routing constraint. For example, route segment 520 passing through road location 512 located within grid 504 would violate an FCC routing constraint, as illustrated and described in more detail with reference to FIG. 5. The violation would occur because an FCC constraint on routing for drive test instructs that a route from a road location within a grid must not pass through a side (e.g., side 536) of the grid that is closest to the road location.

In act 1124, the computer device inserts an intermediate road location proximate to the remaining road location. A route segment passing through the intermediate road location meets the routing constraint. For example, intermediate road location 524 is inserted within grid 504 to meet the routing constraint, as illustrated and described in more detail with reference to FIG. 5. Another FCC constraint specifies a minimum distance for a vehicle performing the drive testing to travel within each grid on a route prior to traveling to a next grid. Hence, the routing methods described herein meet this other constraint by determining the time spent driving within each grid on a route.

In act 1128, the computer device generates a route connecting the remaining road locations for performing the drive testing, wherein the route includes the route segment passing through the intermediate road location. For example, as described in more detail with reference to FIG. 5, after insertion of intermediate road location 524, the route generated includes route segments 532, 528 to drive from road location 512 to road location 524 to road location 526. The drivable route includes the intermediate road location 524. A routing API or route planning software generates the route to avoid traffic between road locations 512, 524, 516. In some implementations, preliminary routing is performed to determine potential routing constraint violations, and intermediate road locations are inserted to meet routing constraints. In other implementations, inserting an intermediate road location is performed prior to generating the route. The computer device can also determine an amount of time needed to complete traveling along the route and a length of the route, for example, in order to balance routes and miles driven per vehicle.

The computer device transmits, to one or more computer devices, the route for performing the drive testing at the remaining road locations in a sequence corresponding to the route. Drive testing at the multiple road locations on a route in a sequence or in an orderly fashion is one of several routing constraints provided by the FCC. The FCC requires that drive testing not be performed in random or ad hoc order. To facilitate the drive testing in a sequence, the implementations disclosed herein generate a specific order of grids while reducing the drive time and distance driven. An output of the route generation (conveyed to the one or more computer devices) is an ordered list of road locations that are sent in a work order to the drive tester teams. A drive tester performs the drive testing of a cluster of road locations based on the order provided in the work order, e.g., road locations for grid #1, grid #2, grid #3, and so forth, and not in any other order. If a drive tester cannot perform drive testing at a particular road location in the field, the drive tester is required to provide a "SKIP" reason and test the other road locations in the same order.

Figure 12:
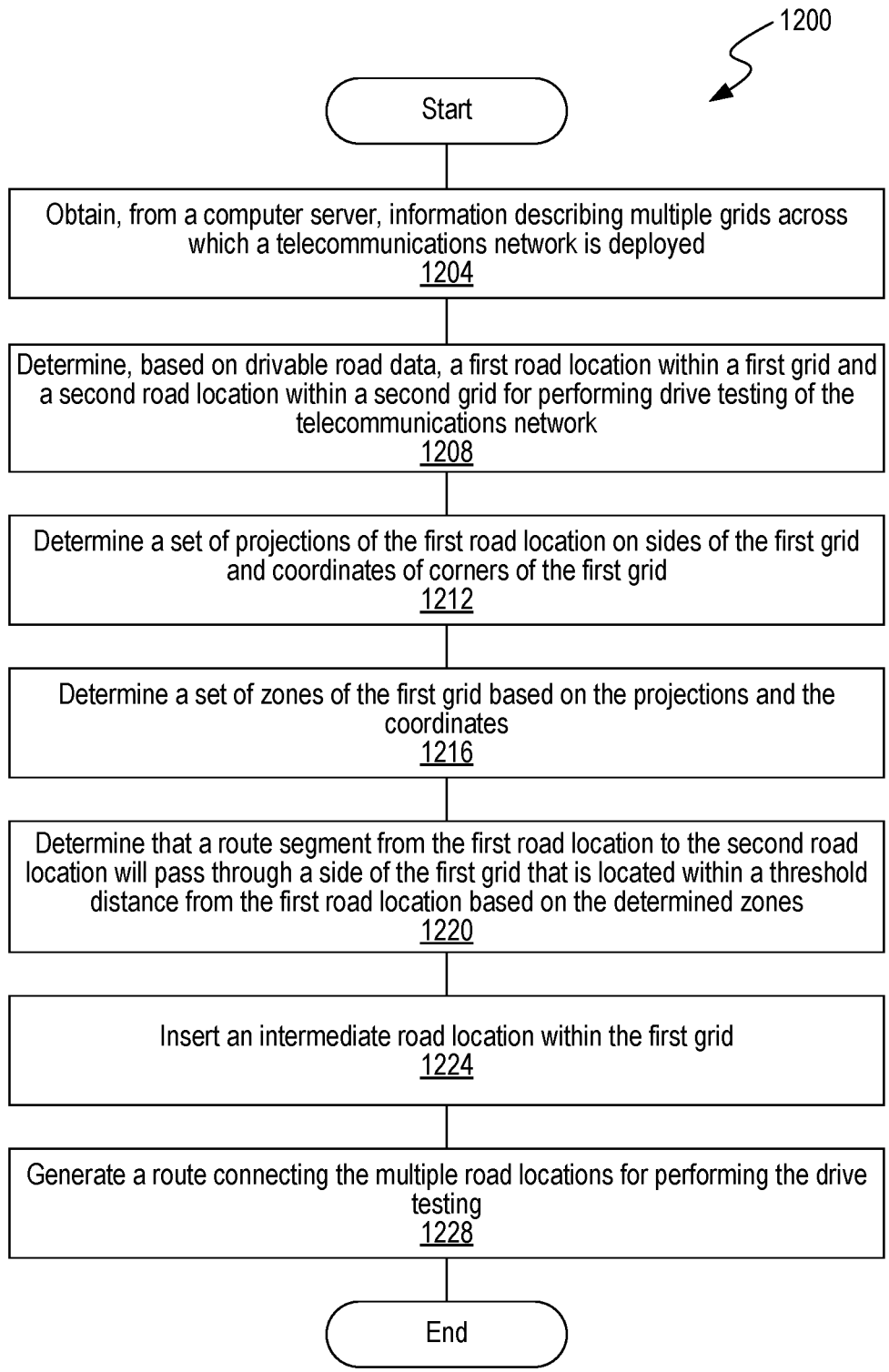
FIG. 12 is a flowchart that illustrates an example process for location clustering and routing for drive testing.

FIG. 12 is a flowchart that illustrates an example process for location clustering and routing for drive testing. In some implementations, the process is performed by the automated routing tool described in more detail with reference to FIG. 8. In some implementations, the process is performed by a computer system, e.g., the example computer system 1400 illustrated and described in more detail with reference to FIG. 14. Particular entities, for example, a computer server, one or more computer devices, or a mobile device within a vehicle perform some or all of the steps of the process in other implementations. The computer server, the one or more computer devices, and the mobile device can be implemented by the example computer system 1400 illustrated and described in more detail with reference to FIG. 14. Likewise, implementations can include different and/or additional steps or can perform the steps in different orders.

In act 1204, a computer device obtains, from a computer server, information describing multiple grids across which a telecommunications network is deployed. Example grids 304, 316 are illustrated and described in more detail with reference to FIG. 3. Drivable road data is accessed using an API. For example, drivable road data can be accessed from a geographic database, road data surveys, traces from aerial imagery, other licensed geodata sources, or a combination thereof.

In act 1208, the computer device determines a first road location within a first grid and a second road location within a second grid based on the drivable road data. The determination of the road locations is made for performing drive testing of the telecommunications network. An example road location 308 is illustrated and described in more detail with reference to FIG. 3.

In act 1212, the computer device determines a set of projections of the first road location on sides of the first grid. As illustrated and described in more detail with reference to FIG. 6, example projections 616*a-d* of a first road location 632 are determined on sides (including side 640) of a first grid 604. The computer device extracts coordinates of corners of the first grid. Example corners 612*a-d* of grid 604 are illustrated and described in more detail with reference to FIG. 6. The coordinates can be GPS coordinates and/or expressed in terms of degrees, minutes, and seconds. The computer system determines bearings from the first road location to the projections and the coordinates.

In act 1216, the computer device determines a set of zones of the first grid based on the bearings. Example zones 636a, 636b are illustrated and described in more detail with reference to FIG. 6. The computer device determines a second bearing from the first road location to the second road location. An example second road location 644 is illustrated and described in more detail with reference to FIG. 6. In some implementations, the bearings and the second bearing are normalized to a scale of 0° to 360° for comparing the second bearing to the set of zones. For example, the bearings and second bearing are adjusted to the notionally common scale of 0° to 360°. Based on comparing the second bearing to the set of zones, a zone is identified that a line from the first road location to the second road location will pass through. For example, the example zone identified in FIG. 6 is zone 636b and the example line between the first and second road locations is line 620.

In act 1220, the computer device determines that a route segment between the first road location and the second road location would pass through a side of the first grid that is located within a threshold distance from the first road location based on the determined zone from act 1216 and the set of projections from act 1212. The threshold distance is described in more detail with reference to FIG. 6. The identified side of the first grid (that the line between the first and second road locations passes through) corresponds to the determined zone. For example, if the line between the first and second road locations 632, 644 lies in zones 636a, 636h illustrated in FIG. 6, projection 616a is selected. However, if the line between the first and second road locations 632, 644 lies in zones 636b, 636hc illustrated in FIG. 6, projection 616b is selected.

In the example of FIG. 6, the side of the first grid 604 that is located within a threshold distance from the first road location 632 is side 640. In some implementations, the computer device determines that the side of the first grid is located within a threshold distance from the first road location by selecting a projection of the set of projections based on the determined zone. For example, the computer device determines that side 640 of grid 604 is located within a threshold distance from the first road location 632 by selecting projection 636c based on the determined zone. A distance between the first road location 632 and the selected projection 636c is determined. The distance is compared to the threshold distance.

In act 1224, the computer device inserts an intermediate road location within the first grid. An example intermediate road location 628 is illustrated and described in more detail with reference to FIG. 6. The side of the first grid is spaced further than the threshold distance from the intermediate road location. The threshold distance is typically in a range from 200-300 m. In some implementations, the intermediate road location is inserted at a furthest drivable road location within the first grid from the first road location.

In act 1228, the computer device generates a route for performing the drive testing. The route passes through the first road location, the intermediate road location, and the second road location in order. The route is sent to one or more other computer devices for performing the drive testing at multiple road locations in a sequence corresponding to the route. The multiple road locations include the first road location, the intermediate road location, and the second road location in order.

Figure 13:
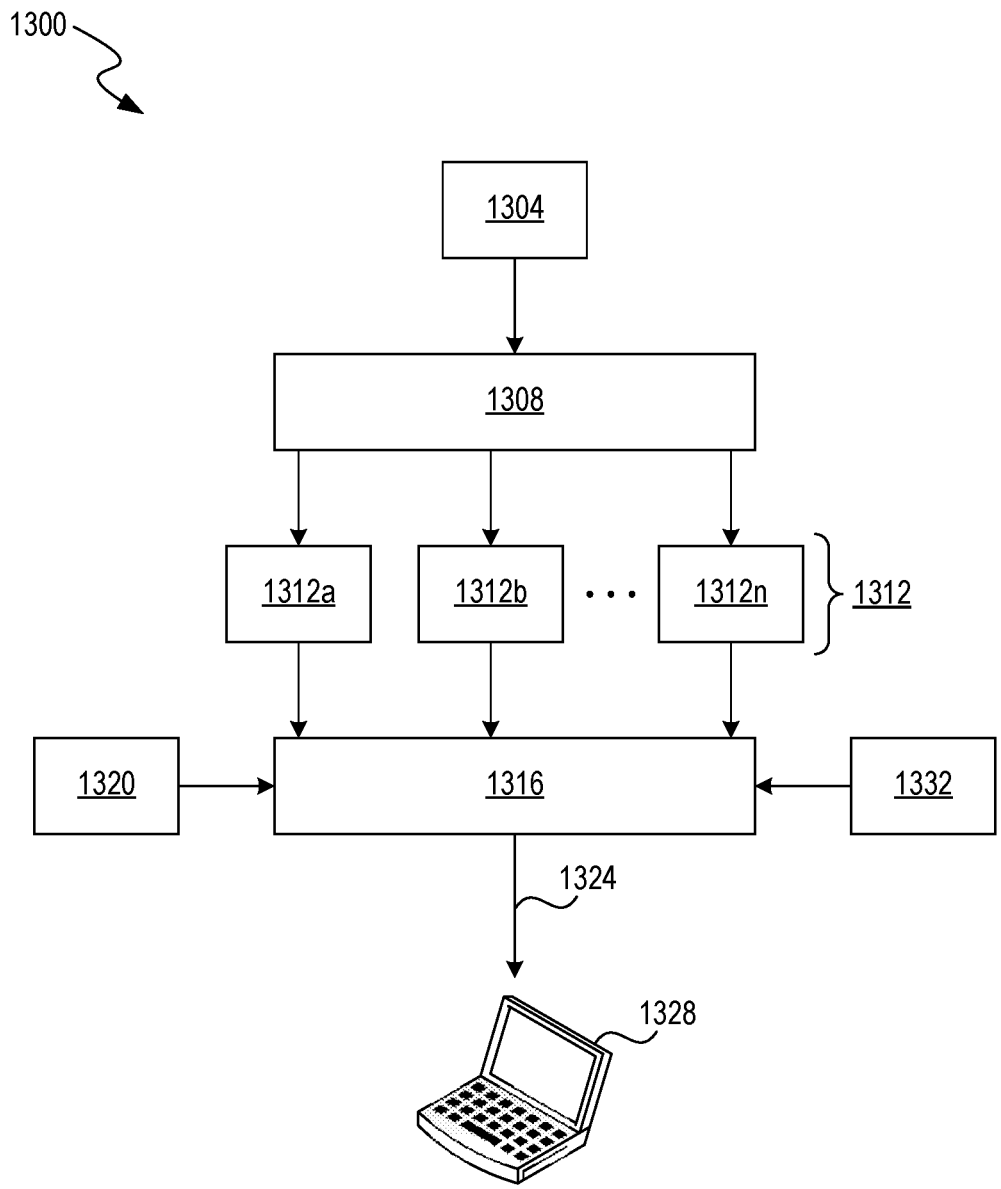
FIG. 13 is a block diagram that illustrates an example ML system that can implement aspects of the present technology.

FIG. 13 is a block diagram that illustrates an example machine learning (ML) system 1300 that can implement aspects of the present technology. The ML system 1300 is implemented using components of the example computer system 1400 illustrated and described in more detail with reference to FIG. 14. For example, the ML system 1300 can be implemented on the processor 1402 using instructions 1408 programmed in the memory 1406 illustrated and described in more detail with reference to FIG. 14. Likewise, implementations of the ML system 1300 can include different and/or additional components or be connected in different ways. The ML system 1300 is sometimes referred to as a ML module.

The ML system 1300 includes a feature extraction module 1308 implemented using components of the example computer system 1400 illustrated and described in more detail with reference to FIG. 14. In some implementations, the feature extraction module 1308 extracts a feature vector 1312 from input data 1304. For example, the input data 1304 can be grid coordinates, test locations, or road locations. The feature vector 1312 includes features 1312a, 1312b, . . . , 1312n. For example, the feature extraction module 1308 extracts a feature vector from road locations or grid coordinates The feature extraction module 1308 reduces the redundancy in the input data 1304, e.g., repetitive data values, to transform the input data 1304 into the reduced set of features 1312, e.g., features 1312a, 1312b, . . . , 1312n. The feature vector 1312 contains the relevant information from the input data 1304, such that events or data value thresholds of interest can be identified by the ML model 1316 by using this reduced representation. In some example implementations, the following dimensionality reduction techniques are used by the feature extraction module 1308: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate implementations, the ML model 1316 performs deep learning (also known as deep structured learning or hierarchical learning) directly on the input data 1304 to learn data representations, as opposed to using task-specific algorithms. In deep learning, no explicit feature extraction is performed; the features 1312 are implicitly extracted by the ML system 1300. For example, the ML model 1316 can use a cascade of multiple layers of nonlinear processing units for implicit feature extraction and transformation. Each successive layer uses the output from the previous layer as input. The ML model 1316 can thus learn in supervised (e.g., classification) and/or unsupervised (e.g., pattern analysis) modes. The ML model 1316 can learn multiple levels of representations that correspond to different levels of abstraction, wherein the different levels form a hierarchy of concepts. In this manner, the ML model 1316 can be configured to differentiate features of interest from background features.

In alternative example implementations, the ML model 1316, e.g., in the form of a CNN generates the output 1324, without the need for feature extraction, directly from the input data 1304. For example, the output 1324 is a set of grid clusters. In another example, the output 1324 is a set of unroutable test locations or a generated route for drive testing.

The output 1324 is provided to the computer device 1328 or the computer system described in more detail with reference to FIGS. 3-8. The computer device 1328 is a server, computer, tablet, smartphone, smart speaker, etc., implemented using components of the example computer system 1400 illustrated and described in more detail with reference to FIG. 14. In some implementations, the steps performed by the ML system 1300 are stored in memory on the computer device 1328 for execution. In other implementations, the output 1324 is displayed on the display device 1418 illustrated and described in more detail with reference to FIG. 14.

The ML model 1316 can be a CNN that includes both convolutional layers and max pooling layers. A CNN is a type of feed-forward artificial neural network in which the connectivity pattern between its neurons is inspired by the organization of a visual cortex.

Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multi-layer perceptrons designed to use minimal amounts of preprocessing. The architecture of the ML model 1316 can be "fully convolutional," which means that variable-sized test location data vectors can be fed into it. For all convolutional layers, the ML model 1316 can specify a kernel size, a stride of the convolution, and an amount of zero padding applied to the input of that layer. For the pooling layers, the model 1316 can specify the kernel size and stride of the pooling.

In some implementations, the ML system 1300 trains the ML model 1316, based on the training data 1320, to correlate the feature vector 1312 to expected outputs in the training data 1320. For example, the ML model 1316 is trained to group multiple grids into multiple clusters, as described in more detail with reference to FIG. 9. As part of the training of the ML model 1316, the ML system 1300 forms a training set of features and training labels by identifying a positive training set of features that have been determined to have a desired property in question, and, in some implementations, forms a negative training set of features that lack the property in question.

The ML system 1300 applies ML techniques to train the ML model 1316, that when applied to the feature vector 1312, outputs indications of whether the feature vector 1312 has an associated desired property or properties, such as a probability that the feature vector 1312 has a particular Boolean property, or an estimated value of a scalar property. The ML system 1300 can further apply dimensionality reduction (e.g., via linear discriminant analysis (LDA), PCA, or the like) to reduce the amount of data in the feature vector 1312 to a smaller, more representative set of data.

The ML system 1300 can use supervised ML to train the ML model 1316, with feature vectors of the positive training set and the negative training set serving as the inputs. In some implementations, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example implementations, a validation set 1332 is formed of additional features, other than those in the training data 1320, which have already been determined to have or to lack the property in question. The ML system 1300 applies the trained ML model 1316 to the features of the validation set 1332 to quantify the accuracy of the ML model 1316. Common metrics applied in accuracy measurement include: Precision and Recall, where Precision refers to a number of results the ML model 1316 correctly predicted out of the total it predicted, and Recall is a number of results the ML model 1316 correctly predicted out of the total number of features that had the desired property in question. In some implementations, the ML system 1300 iteratively re-trains the ML model 1316 until the occurrence of a stopping condition, such as the accuracy measurement indication that the ML model 1316 is sufficiently accurate, or a number of training rounds having taken place. The validation set 1332 can include example grid clusters or routes. This allows the detected values to be validated using the validation set 1332. The validation set 1332 can be generated based on analysis to be performed.

Computer System

Figure 14:
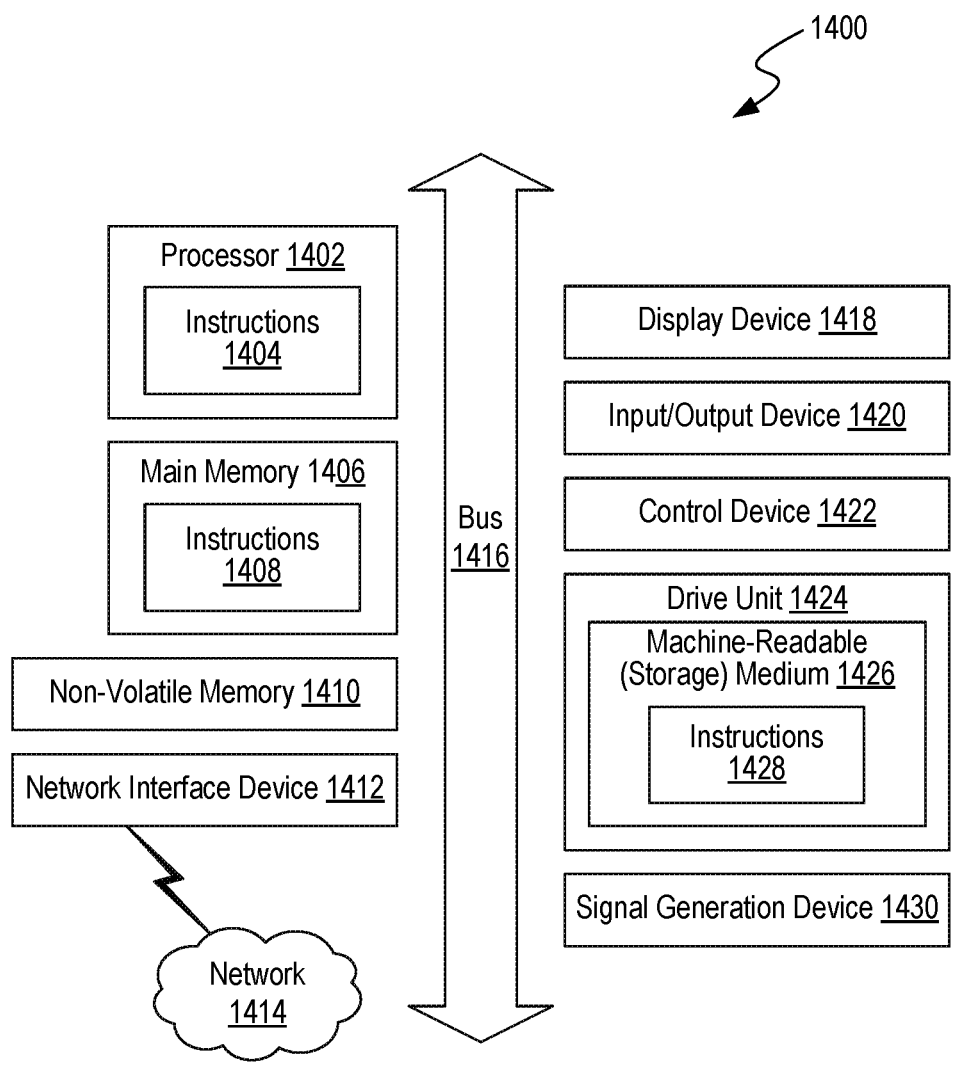
FIG. 14 is a block diagram that illustrates an example of a computer system in which at least some operations described herein can be implemented.

FIG. 14 is a block diagram that illustrates an example of a computer system 1400 in which at least some operations described herein can be implemented. As shown, the computer system 1400 can include: one or more processors 1402, main memory 1406, non-volatile memory 1410, a network interface device 1412, video display device 1418, an input/output device 1420, a control device 1422 (e.g., keyboard and pointing device), a drive unit 1424 that includes a storage medium 1426, and a signal generation device 1430 that are communicatively connected to a bus 1416. The bus 1416 represents one or more physical buses and/or point-to-point connections that are connected by appropriate bridges, adapters, or controllers. Various common components (e.g., cache memory) are omitted from FIG. 14 for brevity. Instead, the computer system 1400 is intended to illustrate a hardware device on which components illustrated or described relative to the examples of the figures and any other components described in this specification can be implemented.

The computer system 1400 can take any suitable physical form. For example, the computing system 1400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1400. In some implementation, the computer system 1400 can be an embedded computer system, a system-on-chip (SOC), a single-board computer system (SBC) or a distributed system such as a mesh of computer systems or include one or more cloud components in one or more networks. Where appropriate, one or more computer systems 1400 can perform operations in real-time, near real-time, or in batch mode.

The network interface device 1412 enables the computing system 1400 to mediate data in a network 1414 with an entity that is external to the computing system 1400 through any communication protocol supported by the computing system 1400 and the external entity. Examples of the network interface device 1412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1406, non-volatile memory 1410, machine-readable medium 1426) can be local, remote, or distributed. Although shown as a single medium, the machine-readable medium 1426 can include multiple media (e.g., a centralized/distributed database and/ or associated caches and servers) that store one or more sets of instructions 1428. The machine-readable (storage) medium 1426 can include any medium that is capable of storing, encoding, or carrying a set of instructions for execution by the computing system 1400. The machine-readable medium 1426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in computing device(s). When read and executed by the processor 1402, the instruction(s) cause the computing system 1400 to perform operations to execute elements involving the various aspects of the disclosure.

Figure 15:
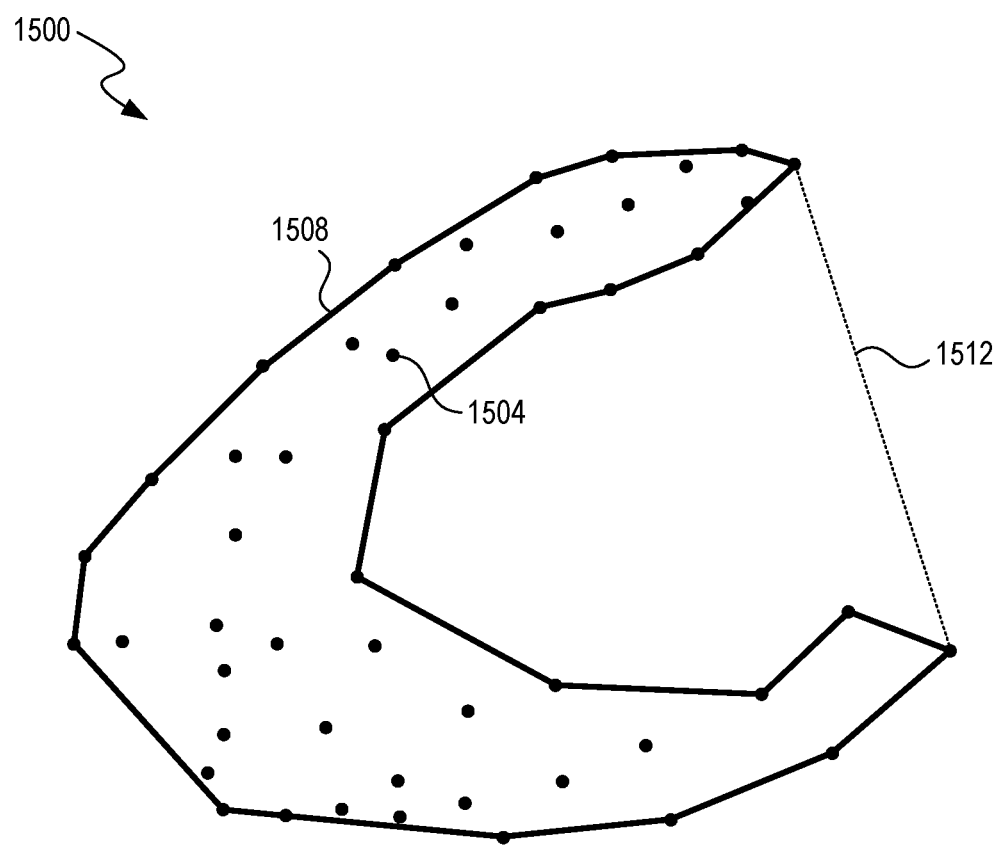
FIG. 15 is a drawing that illustrates an example boundary of a grid cluster.

FIG. 15 is a drawing that illustrates an example boundary 1508 of a grid cluster 1500. Example grids 304, 316 and an example road location 308 are illustrated and described in more detail with reference to FIG. 3. Once grids and road locations (e.g., road location 1504) have been grouped into grid cluster 1500 using the methods described in more detail with reference to FIG. 7, a computer system generates boundary 1508 of grid cluster 1500 for performing drive testing. The computer system is the same as or similar to the computer system described in more detail with reference to FIGS. 3-14. Polygons corresponding to the grids within each cluster can be overlaid to provide the boundary. For example, an overlay of the grid-polygons within cluster 1500 is performed to generate boundary 1508 around cluster 1500. In some implementations, the boundary generated is a concave hull. A concave hull is a (usually) concave geometry which contains the input road locations, and whose vertices are a subset of the input road locations. In the general case the concave hull is a Polygon. A convex hull (e.g., having edge 1512) can also be generated.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of examples, certain implementations are presented below in certain example forms, but the applicant contemplates various aspects of an invention in other forms. For example, aspects of an example can be recited in a means-plus-function form or in other forms, such as being embodied in a computer-readable medium. An example intended to be interpreted as a mean-plus-function example will use the words "means for." However, the use of the term "for" in any other context is not intended to invoke a similar interpretation. The applicant reserves the right to pursue such additional example forms in either this application or in a continuing application.

I claim:

1. A system comprising:
   at least one hardware processor; and
   at least one non-transitory memory storing instructions, which, when executed by the at least one hardware processor, cause the system to:
   obtain, from a computer server, information describing multiple grids across which a telecommunications network is deployed,
      wherein each grid of the multiple grids includes a test location for performing drive testing of the telecommunications network;
   determine, based on drivable road data, a road location within each grid,
      wherein the road location is located within a first threshold distance from the test location;
   remove, using a machine learning model, an unroutable subset of the multiple grids, based on the drivable road data, to provide a routable subset of the multiple grids;
   group, using the machine learning model, the routable subset of the multiple grids into multiple clusters based on the information,
      wherein each cluster of the multiple clusters includes one or more grids of the routable subset, and
      wherein a distance between the one or more grids is within a second threshold distance;
   for each cluster, generate a route segment connecting one or more road locations within the one or more grids to provide multiple route segments;
   generate a route connecting the multiple route segments for performing the drive testing; and
   transmit, to one or more computer devices, the route for performing the drive testing at the multiple road locations in a sequence corresponding to the route,
      wherein driving in accordance with the route prevents traveling directly between remote road locations.

2. The system of claim 1, wherein the instructions cause the system to:
   generate the route connecting the multiple route segments to prevent generating route segments directly connecting the remote road locations.

3. The system of claim 1, wherein the machine learning model uses k-means clustering.

4. The system of claim 1, wherein the instruction to remove the unroutable subset of the multiple grids cause the system to:
   cluster, using the machine learning model, the unroutable subset from the multiple grids based on the drivable road data,
      wherein a grid of the unroutable subset lacks a drivable road,
      wherein the road location is located on a private road,
      wherein a test location corresponding to the unroutable subset is located on a boundary of the grid, or
      wherein the road location is blocked.

5. The system of claim 1, wherein the route is generated to avoid traffic between the multiple road locations.

6. The system of claim 1, wherein the machine learning model uses unsupervised learning.

7. The system of claim 1, wherein the instructions cause the system to:
   determine an amount of time needed to complete traveling along the route and a length of the route.

8. At least one non-transitory computer-readable storage medium storing instructions, which, when executed by at least one data processor of a system, cause the system to:
   obtain, from a computer server, information describing a geographical area segmented into multiple grids across which a telecommunications network is deployed,
      wherein the multiple grids include multiple test locations for performing drive testing of the telecommunications network;
   determine multiple road locations based on drivable road data for the multiple grids,
      wherein each road location of the multiple road locations is located within a threshold distance from a test location;
   identify at least one routable road location from the multiple road locations;
   generate multiple route segments connecting the at least one routable road location to each other road location of the multiple road locations for determining routability of each other road location;
   responsive to determining failure of generating a route segment connecting the at least one routable road location to an other road location of the multiple road locations,
   remove the other road location from the multiple road locations to provide remaining road locations;
   generate a route connecting the at least one routable road location and the remaining road locations for performing the drive testing; and
   transmit, to one or more computer devices, the route for performing the drive testing in a sequence corresponding to the route.

9. The non-transitory computer-readable storage medium of claim 8, wherein the instructions to determine failure of generating the route segment cause the system to:
   determine that a grid corresponding to the other road location lacks a drivable road.

10. The non-transitory computer-readable storage medium of claim 8, wherein the instructions to determine failure of generating the route segment cause the system to:
    determine that the other road location is located on a private road.

11. The non-transitory computer-readable storage medium of claim 8, wherein the instructions to determine failure of generating the route segment cause the system to:
 determine that a test location corresponding to the other road location is located on a boundary of a grid.

12. The non-transitory computer-readable storage medium of claim 8, wherein the instructions to determine failure of generating the route segment cause the system to:
 determine that the other road location is blocked.

13. The non-transitory computer-readable storage medium of claim 8, wherein performing the drive testing using a vehicle according to the route reduces greenhouse gas emissions by reducing a number of miles driven by the vehicle compared to performing the drive testing according to the multiple grids.

14. The non-transitory computer-readable storage medium of claim 8, wherein performing the drive testing comprises determining network performance of the telecommunications network from a vehicle at the remaining road locations while the vehicle is moving.

15. A method comprising:
 obtaining, from a computer server, information describing multiple grids across which a telecommunications network is deployed,
  wherein each grid of the multiple grids includes a test location for performing drive testing of the telecommunications network;
 determining, based on drivable road data, a road location within each grid,
  wherein the road location is located within a first threshold distance from the test location;
 removing, using a machine learning model, an unroutable subset of the multiple grids, based on the drivable road data, to provide a routable subset of the multiple grids;
 grouping, using the machine learning model, the routable subset of the multiple grids into multiple clusters based on the information,
  wherein each cluster of the multiple clusters includes one or more grids of the routable subset, and
  wherein a distance between the one or more grids is within a second threshold distance;
 for each cluster, generating a route segment connecting one or more road locations within the one or more grids to provide multiple route segments;
 generating a route connecting the multiple route segments for performing the drive testing; and
 transmitting, to one or more computer devices, the route for performing the drive testing at the multiple road locations in a sequence corresponding to the route,
  wherein driving in accordance with the route prevents traveling directly between remote road locations.

16. The method of claim 15, further comprising:
 generating the route connecting the multiple route segments to prevent generating route segments directly connecting the remote road locations.

17. The method of claim 15, wherein the machine learning model uses k-means clustering.

18. The method of claim 15, wherein removing the unroutable subset of the multiple grids further comprises:
 clustering, using the machine learning model, the unroutable subset from the multiple grids based on the drivable road data,
  wherein a grid of the unroutable subset lacks a drivable road,
  wherein the road location is located on a private road,
  wherein a test location corresponding to the unroutable subset is located on a boundary of the grid, or
  wherein the road location is blocked.

19. The method of claim 15, wherein the route is generated to avoid traffic between the multiple road locations.

20. The method of claim 15, wherein the machine learning model uses unsupervised learning.

\* \* \* \* \*